United States Patent
Sei et al.

(10) Patent No.: US 12,473,113 B2
(45) Date of Patent: Nov. 18, 2025

(54) PACKAGING APPARATUS

(71) Applicant: ISHIDA CO., LTD., Kyoto (JP)

(72) Inventors: Keisuke Sei, Ritto (JP); Hideshi Miyamoto, Ritto (JP)

(73) Assignee: ISHIDA CO., LTD., Kyoto (JP)

( * ) Notice: Subject to any disclaimer, the term of this patent is extended or adjusted under 35 U.S.C. 154(b) by 51 days.

(21) Appl. No.: 18/325,010

(22) Filed: May 29, 2023

(65) Prior Publication Data

US 2023/0391490 A1 Dec. 7, 2023

(30) Foreign Application Priority Data

Jun. 1, 2022 (JP) .................................. 2022-089781
Mar. 8, 2023 (JP) .................................. 2023-035285

(51) Int. Cl.
*B65B 61/02* (2006.01)
*B23K 26/352* (2014.01)
*B65B 41/12* (2006.01)

(52) U.S. Cl.
CPC .......... *B65B 61/025* (2013.01); *B23K 26/352* (2015.10); *B65B 41/12* (2013.01)

(58) Field of Classification Search
CPC ......... B65B 41/16; B65B 41/12; B65B 41/18; B65B 57/08; B65B 57/005; B65B 9/20; B65B 51/14; B65B 61/025; B23K 26/352; B41J 2/442; B41J 2/475
See application file for complete search history.

(56) References Cited

U.S. PATENT DOCUMENTS

| | | | | |
|---|---|---|---|---|
| 2008/0099456 A1* | 5/2008 | Schwenke | .............. | B41J 3/4073 222/146.2 |
| 2018/0016047 A1* | 1/2018 | Miyamoto | .............. | B65B 51/26 |
| 2022/0234776 A1* | 7/2022 | Ohura | ..................... | B65B 11/52 |

FOREIGN PATENT DOCUMENTS

| | | |
|---|---|---|
| JP | 2019-064670 A | 4/2019 |
| WO | 2020/241224 A1 | 12/2020 |

OTHER PUBLICATIONS

The Search Report from the corresponding European Patent Application No. 23175736.0 issued on Oct. 27, 2023.

* cited by examiner

*Primary Examiner* — Thomas M Wittenschlaeger
(74) *Attorney, Agent, or Firm* — United IP Counselors, LLC

(57) ABSTRACT

A bagmaking and packaging machine packages articles with a film. The bagmaking and packaging machine includes a laser printing device and a receiving member. The laser printing device prints on a printed surface of the film. The receiving member is disposed so as to oppose a non-printed surface on the opposite side of the printed surface of the film. The receiving member has a reflection suppressing surface. The reflection suppressing surface suppresses regular reflection of laser light emitted by the laser printing device.

10 Claims, 14 Drawing Sheets

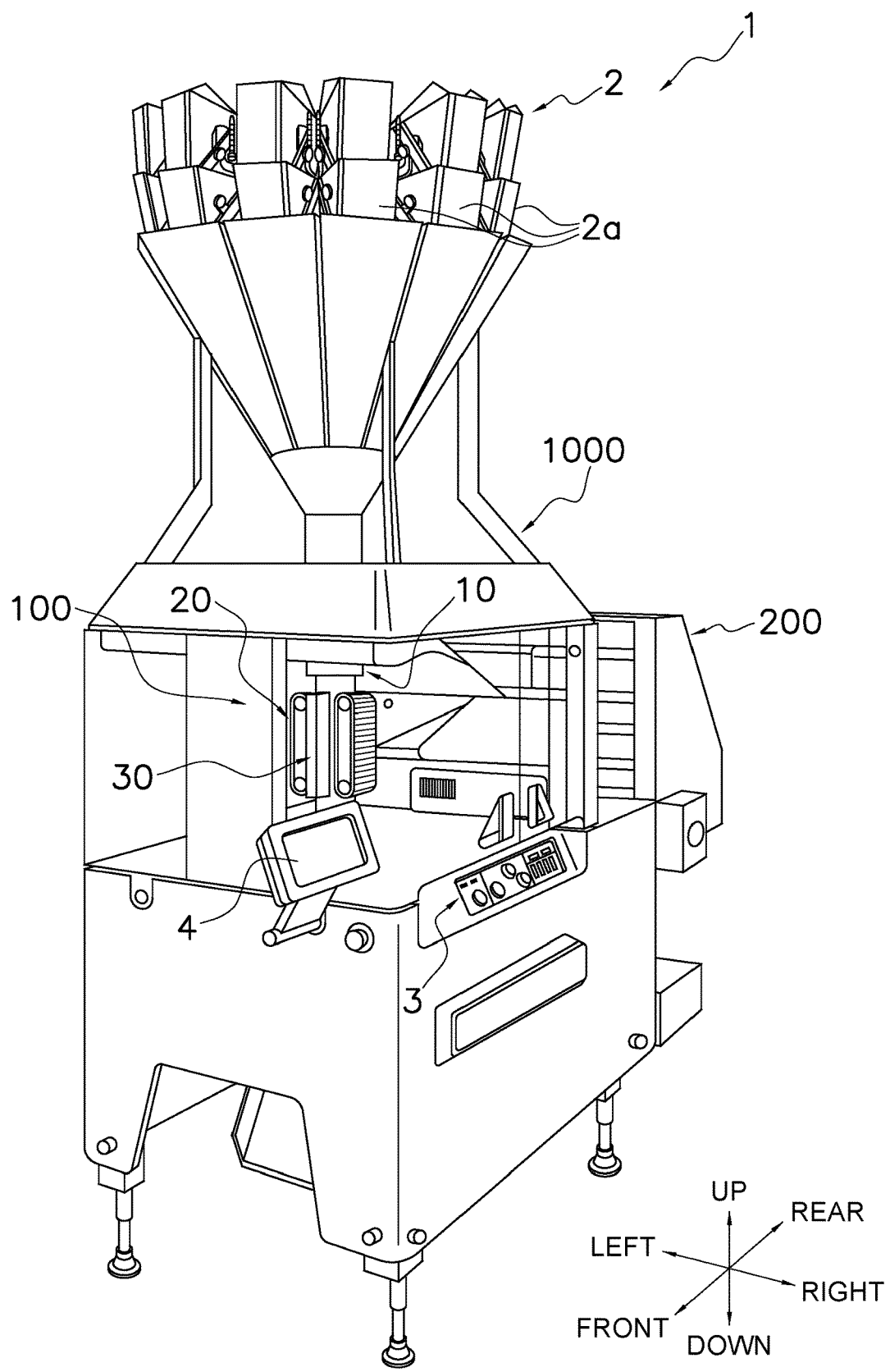
F I G. 1

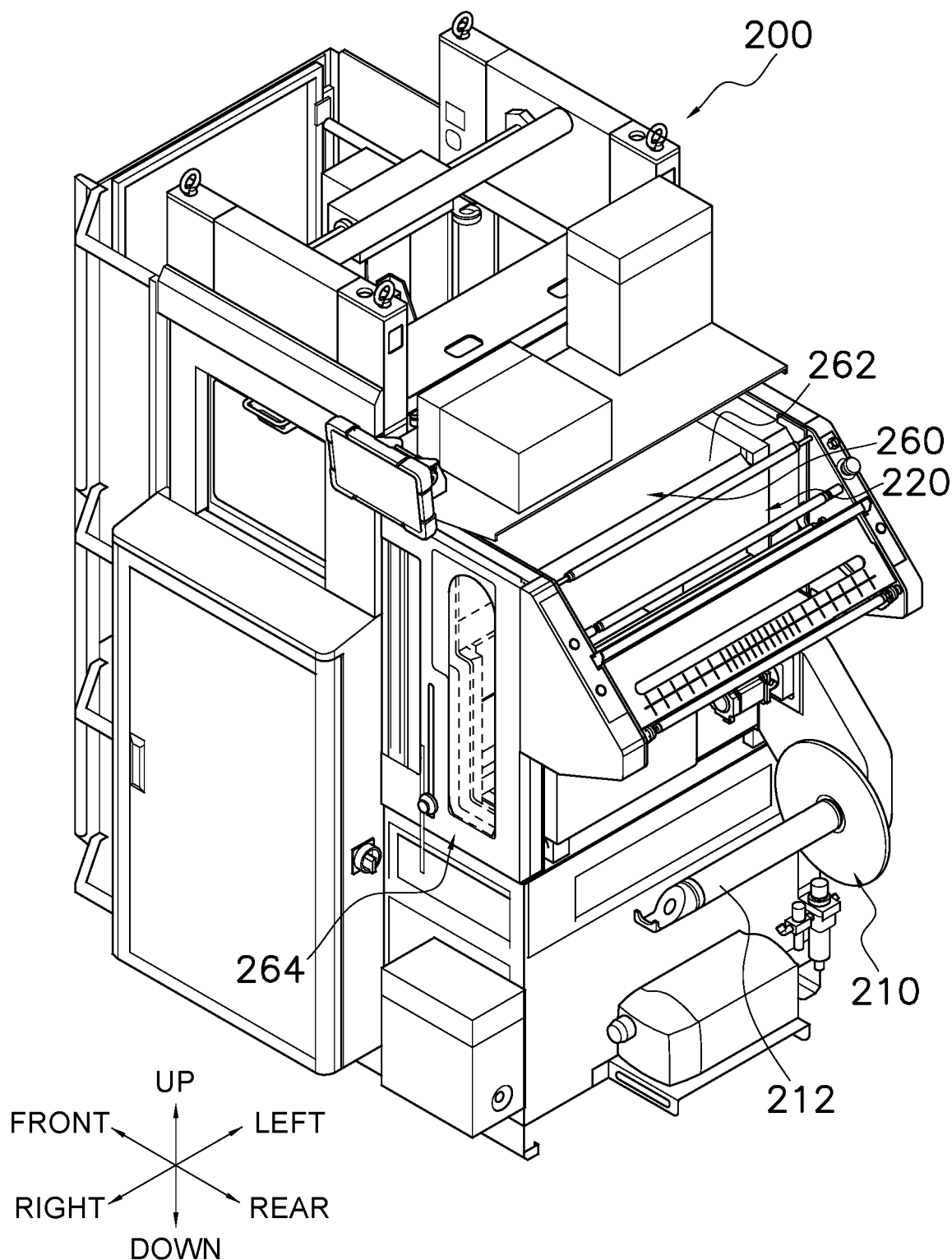
F I G. 3

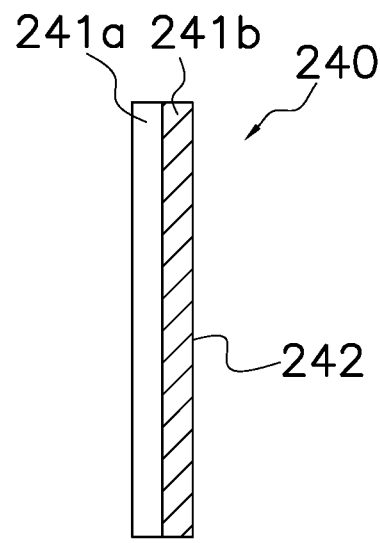
F I G. 7A
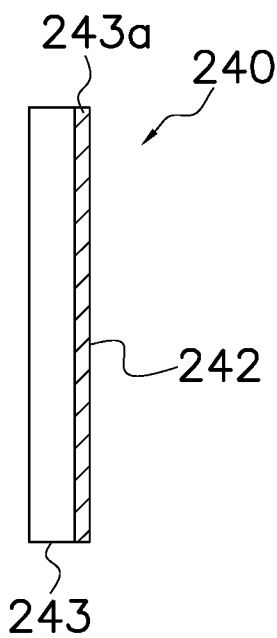
F I G. 7B

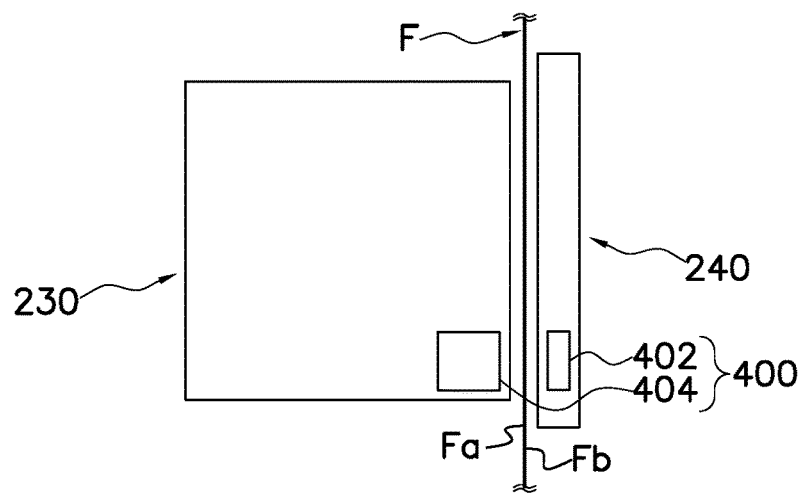
F I G. 12
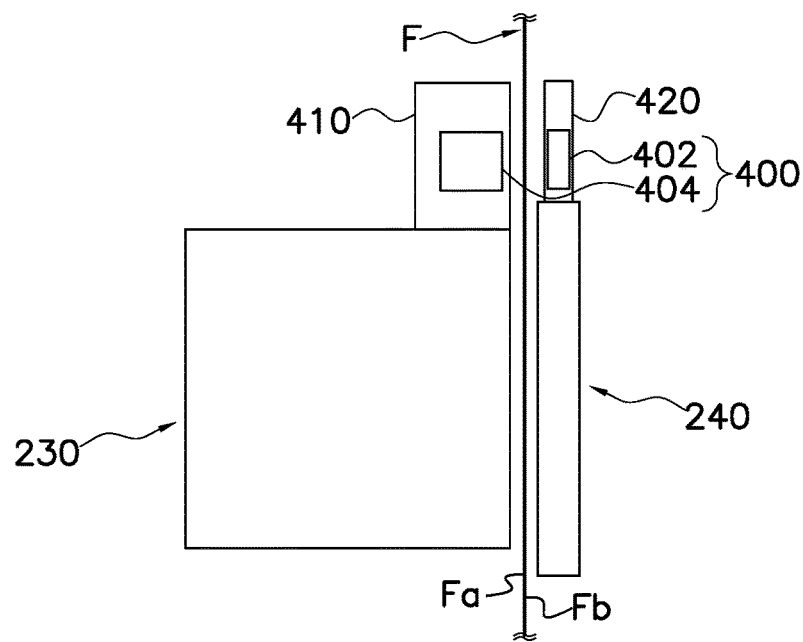
F I G. 13

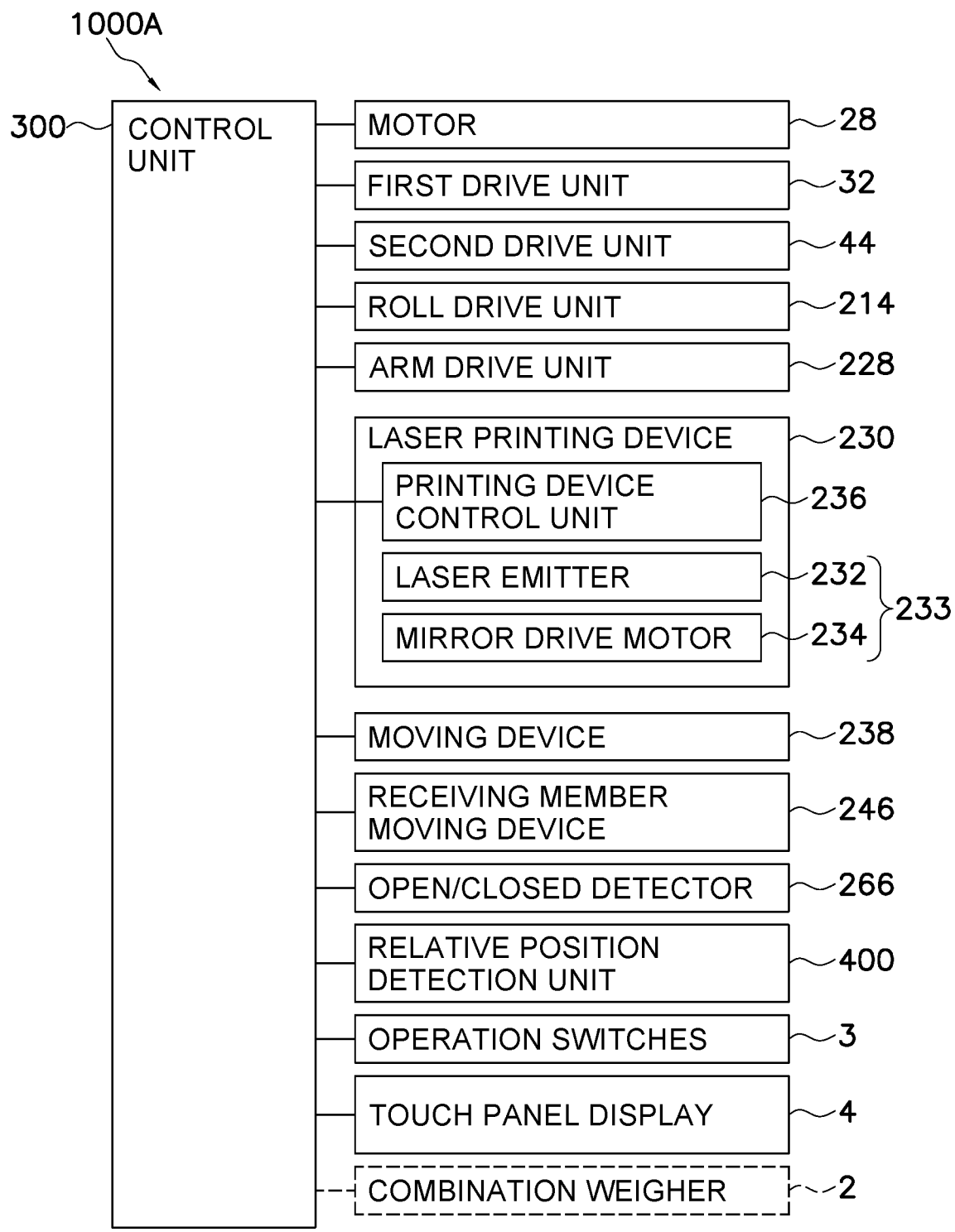
F I G. 14

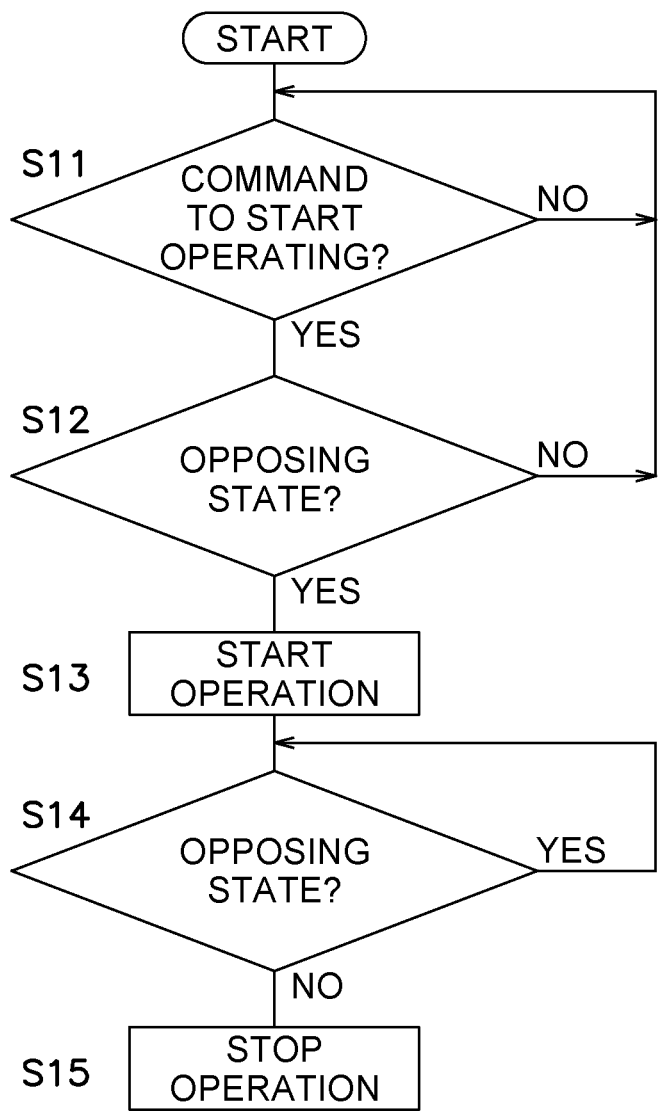
F I G. 15

PACKAGING APPARATUS

CROSS-REFERENCE TO RELATED APPLICATIONS

This application claims priority to, and the benefit of, Japanese Patent Application No. 2022-089781, filed Jun. 1, 2022, and Japanese Patent Application No. 2023-035285, filed Mar. 8, 2023. The contents of both of those applications are incorporated by reference in their entireties.

TECHNICAL FIELD

The present invention relates to a packaging apparatus.

BACKGROUND ART

Packaging apparatus are known which, as in Japanese Patent Document No. JP-A 2019-64670, print various types of information on a film with a thermal printing device to and package articles with the film on which the various types of information have been printed.

BRIEF SUMMARY

Installing laser printing devices instead of thermal printing devices in packaging apparatus is being considered because laser printing devices have advantages such as rendering unnecessary the replacement of consumables such as ink ribbons and thermal heads and eliminating the time in which the apparatus is stopped to replace ink ribbons and clean thermal heads. However, a packaging apparatus having a laser printing device requires safety considerations in use of lasers.

It is an object of the present invention to provide a packaging apparatus in which a laser printing device is installed and which has a high level of safety.

A packaging apparatus pertaining to a first aspect of the invention uses a film to package articles. The packaging apparatus includes a laser printing device and a receiving member. The laser printing device is configured to print on a printed surface of the film. The receiving member is disposed so as to oppose a first surface on an opposite side of the printed surface of the film. The receiving member has a reflection suppressing surface. The reflection suppressing surface is configured to suppress regular reflection of laser light emitted by the laser printing device.

In the packaging apparatus of the first aspect, the receiving member is disposed in a position opposing the first surface on the opposite side of the printed surface of the film, and the receiving member is provided with the reflection suppressing surface that suppresses regular reflection of the laser light. For that reason, in the packaging apparatus of the first aspect, the occurrence of a situation where the laser light that has passed through the film is reflected and has an effect on a person's eyes can be reduced.

A packaging apparatus pertaining to a second aspect of the invention is the packaging apparatus of the first aspect, wherein the receiving member includes a resin portion having the reflection suppressing surface.

In the packaging apparatus of the second aspect, regular reflection of the laser light can be suppressed by the resin portion.

A packaging apparatus pertaining to a third aspect of the invention is the packaging apparatus of the first aspect, wherein the receiving member has a regular reflection suppression processed surface as the reflection suppressing surface.

In the packaging apparatus of the third aspect, as the receiving member is provided with the reflection suppressing surface which has been treated with a regular reflection suppression process, it is not necessary to prepare both a member having the reflection suppressing surface and a main body that supports that member, and the number of parts of the packaging apparatus can be reduced.

A packaging apparatus pertaining to a fourth aspect of the invention is the packaging apparatus of any of the first aspect to the third aspect, further including a film conveyance device, a film retention device, and a control unit. The film conveyance device is configured to convey the film in a conveyance direction. The retention device is disposed upstream of the laser printing device in the conveyance direction. The control unit is configured to control the operation of the film conveyance device.

A packaging apparatus pertaining to a fifth aspect of the invention is the packaging apparatus of the fourth aspect, further including a moving device. The moving device is configured to move the laser printing device in a first direction orthogonal to the conveyance direction to change, in the first direction, a printing position of the laser printing device relative to the printed surface of the film. The reflection suppressing surface of the receiving member oppose the entire first surface of the film in the first direction.

In the packaging apparatus pertaining to the fifth aspect of the invention, when the laser printing device is moved in the first direction for changing the printing position, the occurrence of a situation where the laser light that has passed through the film during printing is reflected by some member without striking the reflection suppressing surface and has an effect on a person's eyes can be suppressed.

A packaging apparatus pertaining to a sixth aspect of the invention is the packaging apparatus of the fourth aspect, wherein the reflection suppressing surface of the receiving member is configured to at least partially contact the first surface of the film conveyed in the conveyance direction.

In the packaging apparatus pertaining to the sixth aspect of the invention, the movement of the film can be regulated, and the occurrence of problems such as deviations in the printing position due to slackness in the film, for example, is easily suppressed.

A packaging apparatus pertaining to a seventh aspect of the invention is the packaging apparatus of the fourth aspect, further including a former and a transverse sealing mechanism. The former and the transverse sealing mechanism are disposed downstream of the laser printing device in the conveyance direction of the film. The former is configured to form the conveyed film in a cylindrical shape. The transverse sealing mechanism is configured to seal the film formed in the cylindrical shape in a direction intersecting the conveyance direction in a state in which the articles have been input to the film formed in the cylindrical shape.

A packaging apparatus pertaining to an eighth aspect of the invention is the packaging apparatus of any of the first aspect to the seventh aspect, further including a cover. The cover is disposed around the laser printing device and is configured to obstruct passage of the laser light emitted by the laser printing device.

In the packaging apparatus pertaining to the eighth aspect of the invention, the level of safety of the packaging apparatus can be enhanced even more.

A packaging apparatus pertaining to a ninth aspect of the invention is the packaging apparatus of the eighth aspect, wherein the cover includes a door for maintenance of the laser printing device. The packaging apparatus further includes a detector and an emission control unit. The detector is configured to detect whether the door is open or closed. The emission control unit is configured to control the emission of the laser light by the laser printing device. The emission control unit is configured to stop the emission of the laser light by the laser printing device in a case where the detector is detecting that the door is open.

In the packaging apparatus pertaining to the ninth aspect of the invention, a high level of safety for the packaging apparatus can be realized.

A packaging apparatus pertaining to a tenth aspect of the invention is the packaging apparatus of any of the first aspect to the ninth aspect, further including a film conveyance device, a moving device, a receiving member moving device, and a control unit. The film conveyance device is configured to convey the film in a conveyance direction. The moving device is configured to move the laser printing device in a first direction orthogonal to the conveyance direction to change, in the first direction, a printing position of the laser printing device relative to the printed surface of the film. The receiving member moving device is configured to move the receiving member in the first direction. The control unit is configured to control the operations of the moving device and the receiving member moving device to cause a region where the laser printing device emits the laser light and the reflection suppressing surface of the receiving member to oppose each other.

In the packaging apparatus of the tenth aspect, as the control unit automatically causes the region where the laser printing device emits the laser light and the reflection suppressing surface of the receiving member to oppose each other, in a case where the receiving member is movable, the occurrence of a situation where the laser light that has passed through the film is reflected and has an effect on a person's eyes can be suppressed.

It will be noted that because the packaging apparatus pertaining to the tenth aspect of the invention has the receiving member moving device that moves the receiving member, the receiving member can be moved to a position where it is less likely to obstruct the work during work such as maintenance. Workability is thus easily improved. Furthermore, because the packaging apparatus pertaining to the tenth aspect of the invention has the receiving member moving device that moves the receiving member, the size of the receiving member need only be a size corresponding to the region where the laser printing device emits the laser light (i.e. the size of the receiving member can be reduced), and the receiving member is less likely to obstruct work such as maintenance.

A packaging apparatus pertaining to an eleventh aspect of the invention is the packaging apparatus of the tenth aspect, further including an emission control unit and a relative position detection unit. The emission control unit is configured to control the emission of the laser light by the laser printing device. The relative position detection unit is configured to detect the relative positions of the laser printing device and the reflection suppressing surface. The emission control unit is configured to stop the emission of the laser light in a case where it is determined, based on the detection result of the relative position detection unit, that the region where the laser printing device emits the laser light and the reflection suppressing surface of the receiving member are not opposing each other.

In the packaging apparatus of the eleventh aspect, as the laser light is not emitted in a case where the region where the laser printing device emits the laser light and the reflection suppressing surface of the receiving member are not opposing each other, the occurrence of a situation where the laser light that has passed through the film is reflected and has an effect on a person's eyes can be suppressed. Therefore, the level of safety is high.

A packaging apparatus pertaining to a twelfth aspect of the invention is the packaging apparatus of the eleventh aspect, wherein the relative position detection unit has a magnet and a magnetic sensor. The magnet is attached to one of (A) the laser printing device or a first member that is configured to be moved together with the laser printing device by the moving device or (B) the receiving member or a second member that is configured to be moved together with the receiving member by the receiving member moving device. The magnetic sensor is attached to the other of (A) the laser printing device or the first member that is configured to be moved together with the laser printing device by the moving device or (B) the receiving member or the second member that is configured to be moved together with the receiving member by the receiving member moving device.

In the packaging apparatus of the twelfth aspect, the relative positions of the laser printing device and the reflection suppressing surface can be accurately detected.

In the packaging apparatus pertaining to the present invention, as the receiving member having the reflection suppressing surface that suppresses regular reflection of the laser light is disposed in a position opposing the first surface, which is on the opposite side of the printed surface of the film, the occurrence of a situation where the laser light that has passed through the film is reflected and has an effect on a person's eyes can be suppressed.

BRIEF DESCRIPTION OF THE DRAWINGS

FIG. 1 is a schematic perspective view of a weighing, bagmaking, and packaging system including a bagmaking and packaging machine pertaining to a first embodiment of the packaging apparatus of the invention;

FIG. 3 is a schematic perspective view of a film supply unit of the bagmaking and packaging machine of FIG. 1;

FIG. 7A is a drawing schematically depicting an example of a receiving member of the film supply unit of FIG. 3;

FIG. 7B is a drawing schematically depicting another example of the receiving member;

FIG. 12 is a drawing schematically depicting a state in which a relative position detection unit is attached to the laser printing device and the receiving member of the film supply unit of FIG. 10;

FIG. 13 is a drawing schematically depicting a state in which the relative position detection unit is attached to a first member attached to the laser printing device and a second member attached to the receiving member of the film supply unit of FIG. 10;

FIG. 14 is a control block diagram of the bagmaking and packaging machine pertaining to the second embodiment; and FIG. 15 is a flowchart describing control of the operation of the bagmaking and packaging machine pertaining to the second embodiment according to whether or not a region where the laser printing device emits laser light and a reflection suppressing surface of the receiving member are in an opposing state.

DETAILED DESCRIPTION

Figure 2:
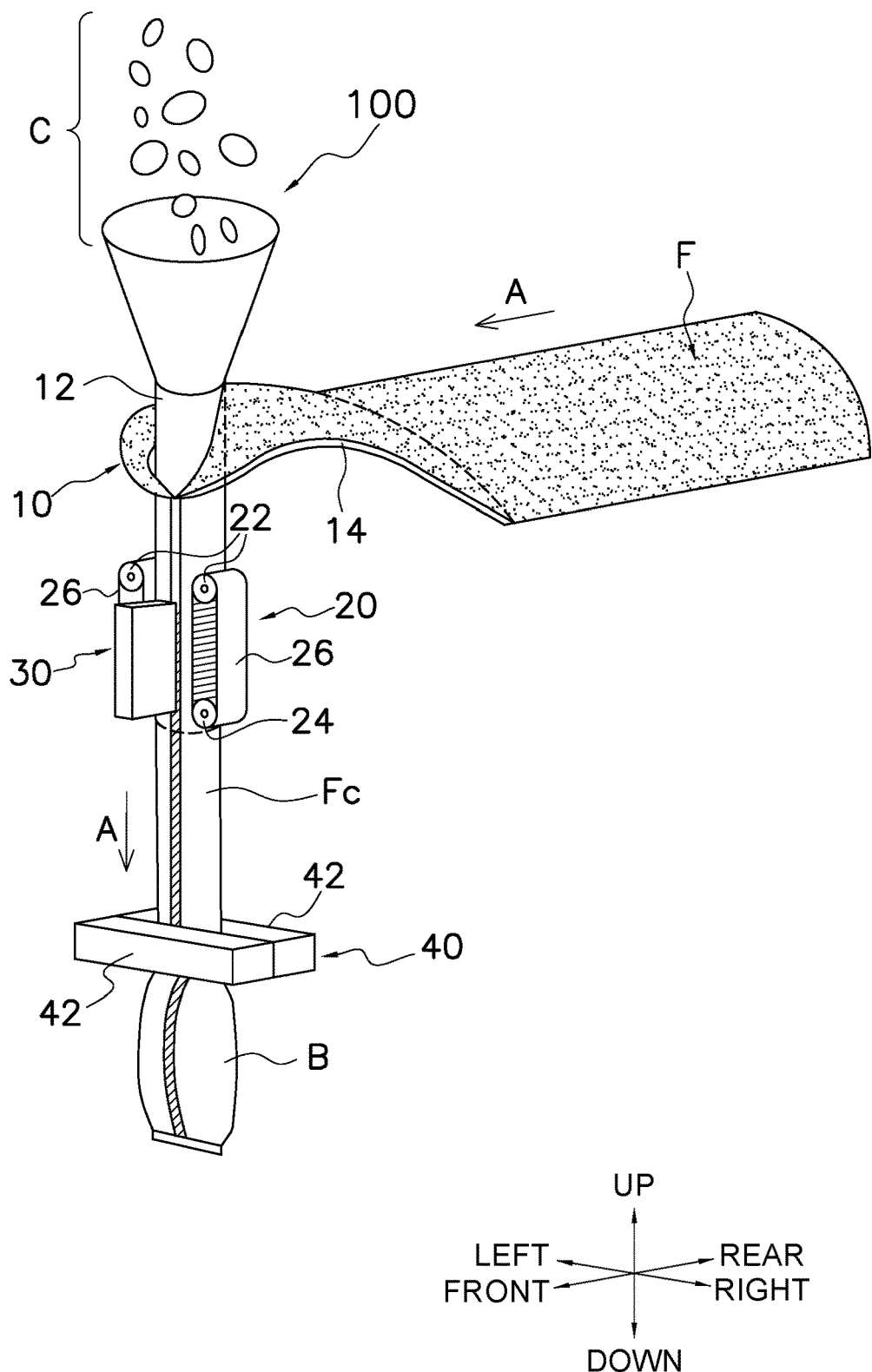
FIG. 2 is a schematic configuration diagram of a bagmaking and packaging unit of the bagmaking and packaging machine of FIG. 1.

Embodiments of the present invention will now be described with reference to the drawings.

Although this is not intended to limit the content of the present invention, in the following description, sometimes expressions such as "front (front side)," "rear (back side)," "upper," "lower," "left," and "right" are used for the sake of convenience to indicate directions and the like. Unless otherwise specified, these expressions indicating directions and the like follow the directions of the arrows in the drawings. Furthermore, in the following description, sometimes expressions such as perpendicular, orthogonal, horizontal, and vertical are used to describe positional relationships and the like, and these expressions include cases where the relationships described by the expressions are substantially perpendicular, orthogonal, horizontal, or vertical.

It will be noted that the following embodiments are merely specific examples of the present invention and are not intended to limit the technical scope of the present invention. It will be understood that many changes may be made without departing from the spirit and scope of the present invention.

First Embodiment (1) Weighing, Bagmaking, and Packaging System

The overall configuration of a weighing, bagmaking, and packaging system 1 including a bagmaking and packaging machine 1000 pertaining to a first embodiment of the packaging apparatus of the invention will now be described with reference to FIG. 1. FIG. 1 is a schematic perspective view of the weighing, bagmaking, and packaging system 1.

The weighing, bagmaking, and packaging system 1 is a system that receives a supply of articles C and makes bags B containing the articles C. The articles C are, for example, foods, although this is not intended to be limiting.

The weighing, bagmaking, and packaging system 1 mainly includes, as in FIG. 1, a combination weigher 2, the bagmaking and packaging machine 1000, operation switches 3, and a touch panel display 4. As in FIG. 1, the bagmaking and packaging machine 1000 is disposed under the combination weigher 2.

The combination weigher 2 mainly has, as in FIG. 1, plural weigh hoppers 2a. The combination weigher 2 uses the plural weigh hoppers 2a to measure a predetermined weight of the articles C and supply the articles C to the bagmaking and packaging machine 1000 disposed below. Specifically, the combination weigher 2 uses conveyance means (not shown in the drawings) to convey and supply the articles C, which are supplied from a supply conveyor or the like (not shown in the drawings), to the plural weigh hoppers 2a. The combination weigher 2 uses weighing means (not shown in the drawings) to measure the weights of the articles C supplied to each of the weigh hoppers 2a. The combination weigher 2 selects a combination of the weigh hoppers 2a so that the total value of the weights of the articles A in the weigh hoppers 2a becomes a predetermined weight. The combination weigher 2 discharges downward the articles C in the weigh hoppers 2a selected for the combination to thereby supply the articles C having the predetermined weight to the bagmaking and packaging machine 1000.

The bagmaking and packaging machine 1000 is an apparatus that receives the supply of the articles C having the predetermined weight from the combination weigher 2, makes a bag-like packaging material from a sheet-like film F, and makes bags B containing the articles C having the predetermined weight inside. The bagmaking and packaging machine 1000 will be described in detail later.

The operation switches 3 and the touch panel display 4 are used to operate the weighing, bagmaking, and packaging system 1. The operation switches 3 and the touch panel display 4 function as an input device that receives various types of instructions with respect to the weighing, bagmaking, and packaging system 1 and various types of settings relating to the weighing, bagmaking, and packaging system 1. The touch panel display 4 functions as an output device that displays various types of information relating to the weighing, bagmaking, and packaging system 1. Here, the operation switches 3 and the touch panel display 4 are shared by the combination weigher 2 and the bagmaking and packaging machine 1000. However, the combination weigher 2 and the bagmaking and packaging machine 1000 are not limited to this and may each have their own dedicated operation switches and touch panel display.

(2) Bagmaking and Packaging Machine

Figure 4:
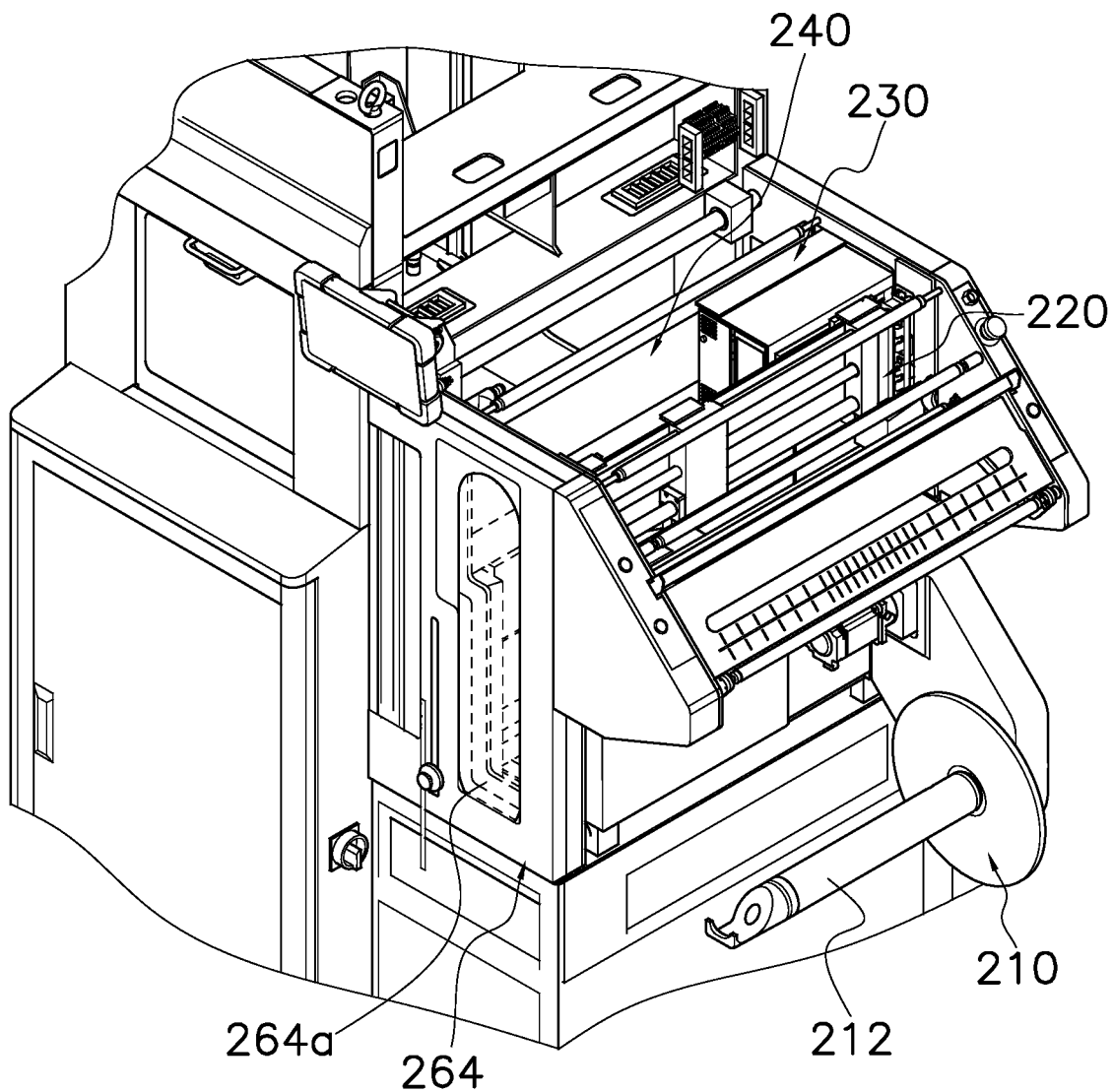
FIG. 4 is a partially enlarged view of the film supply unit of FIG. 3 in a state in which some members are removed so that a laser printing device of the film supply unit can be seen.
Figure 5:
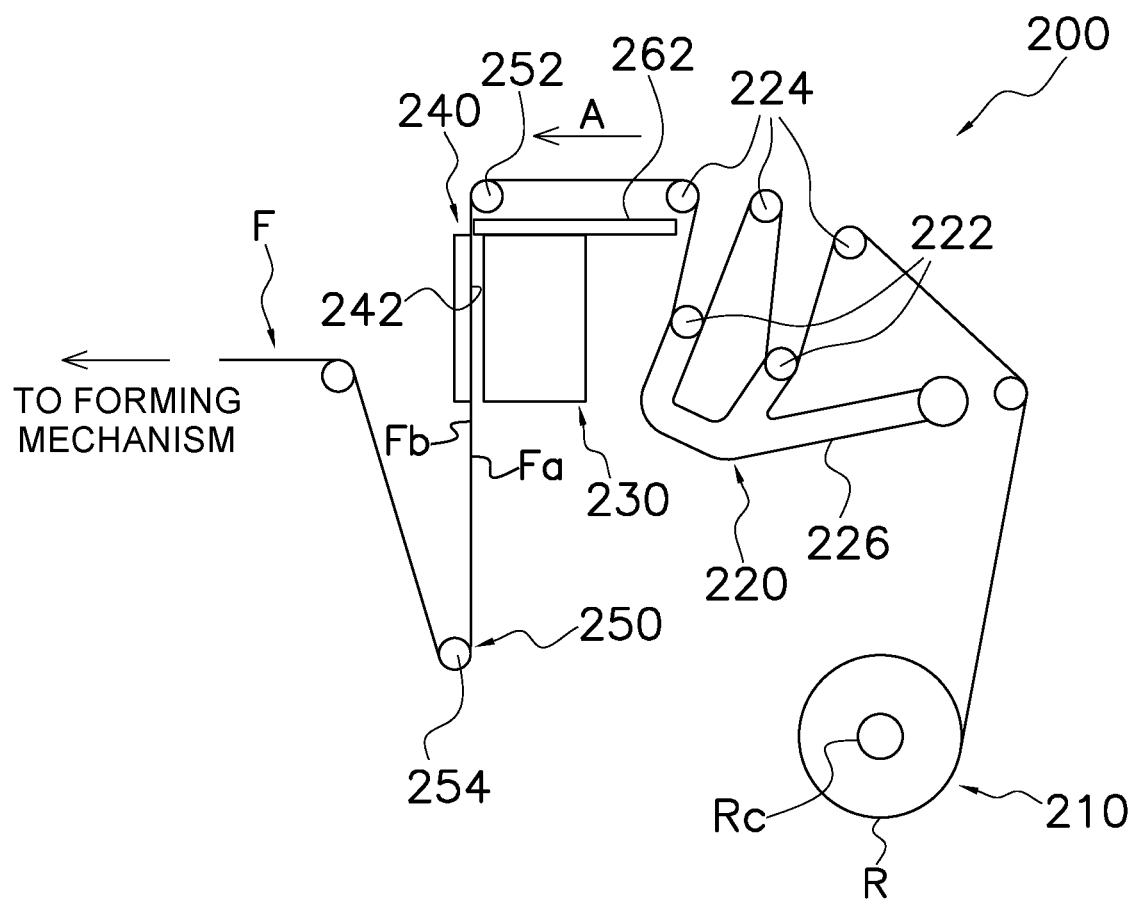
FIG. 5 is a diagram schematically showing a conveyance path of a film in the film supply unit of FIG. 3.
Figure 6:
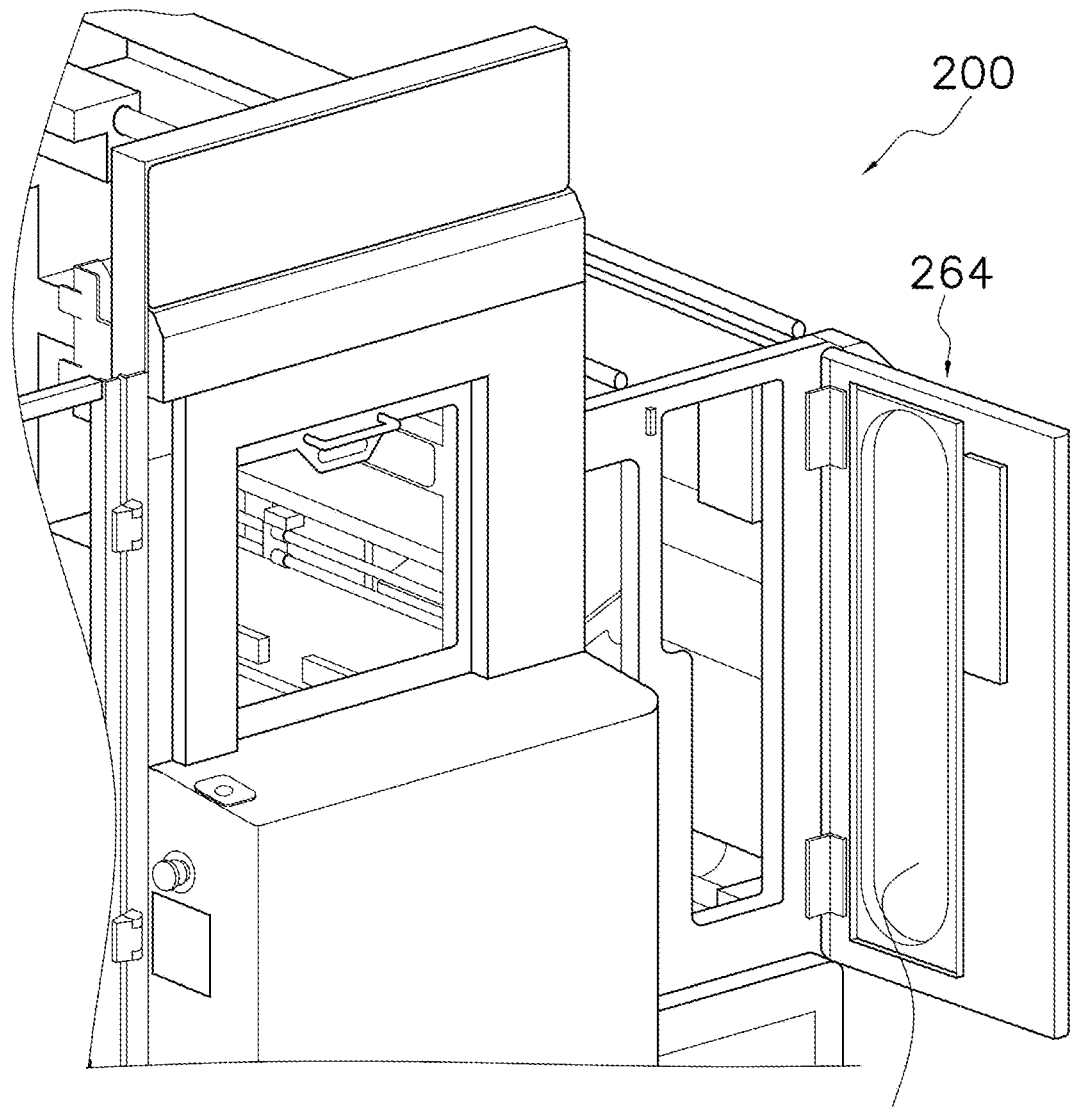
FIG. 6 depicts a state in which a maintenance door of the film supply unit of FIG. 3 is open.
Figure 6:
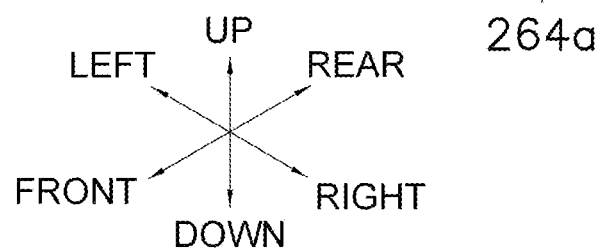
Figure 8:
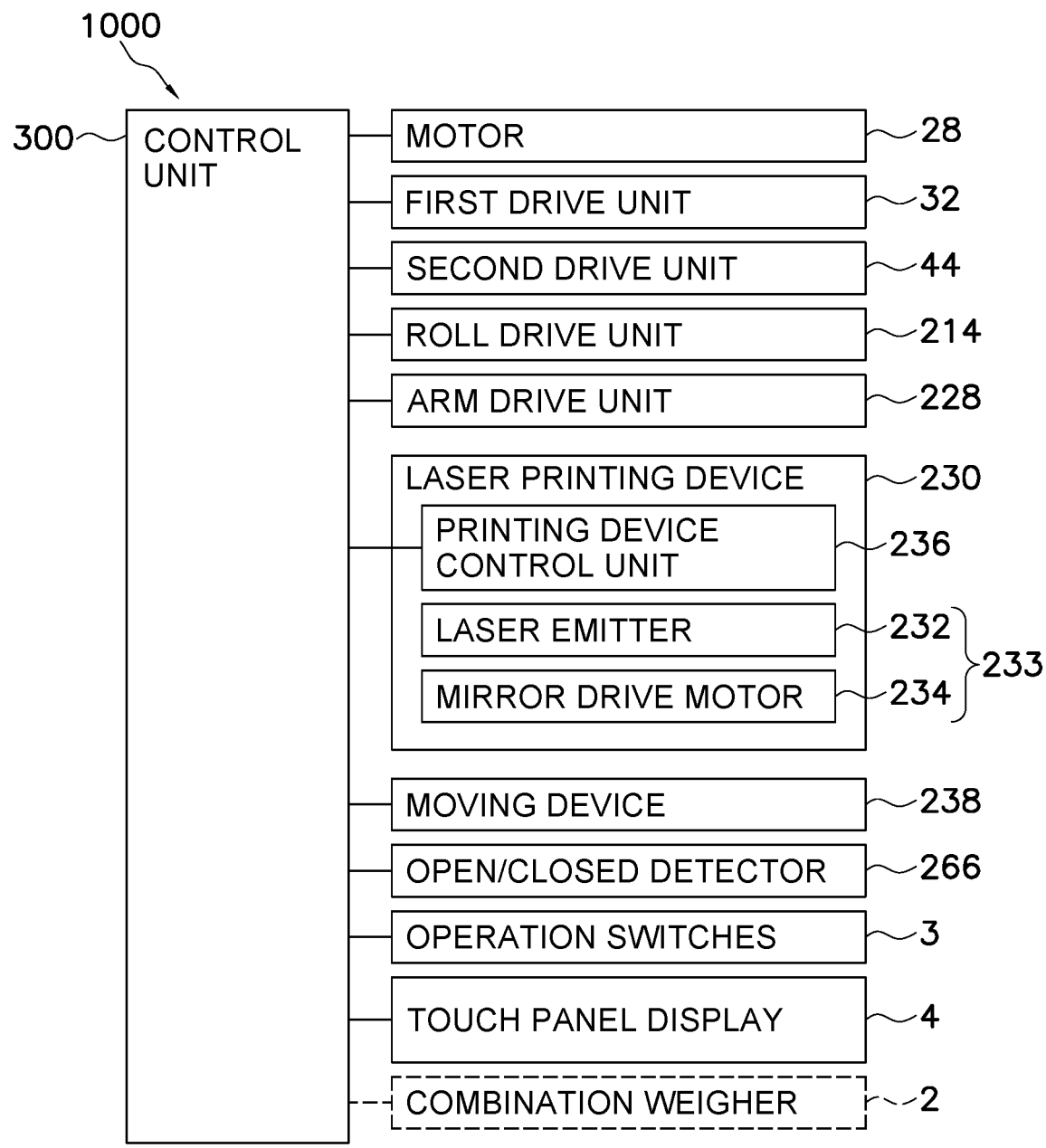
FIG. 8 is a control block diagram of the bagmaking and packaging machine of the weighing, bagmaking, and packaging system of FIG. 1.
Figure 9:
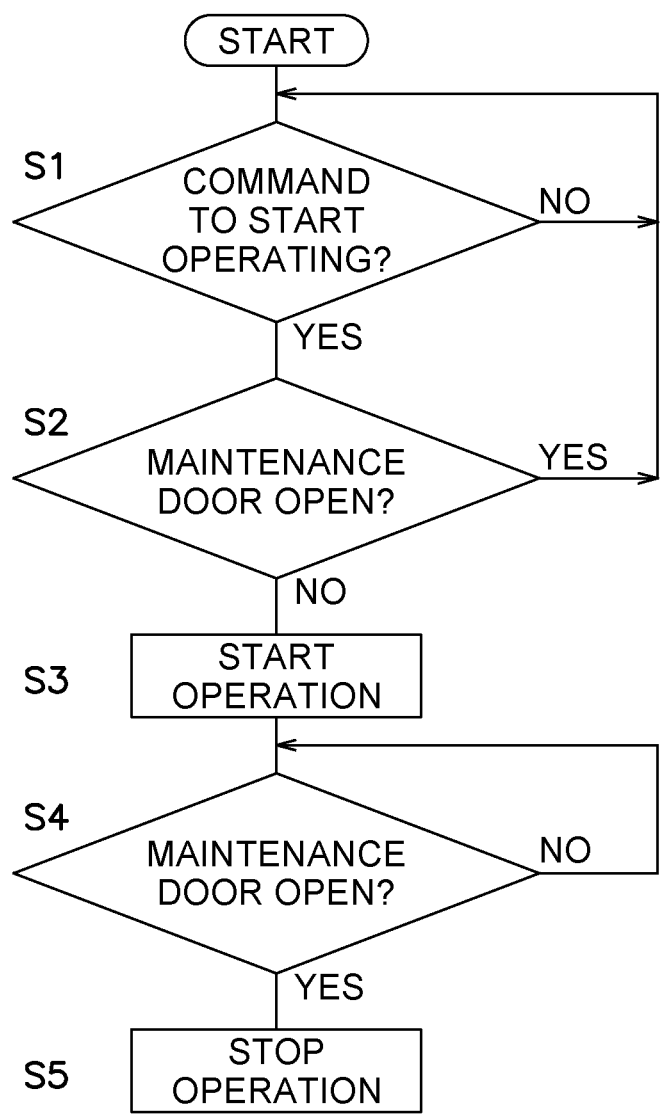
FIG. 9 is a flowchart describing control of the operation of the bagmaking and packaging machine according to whether the maintenance door is open or closed.

The bagmaking and packaging machine 1000 pertaining to the first embodiment of the invention will now be described with reference to FIG. 2 to FIG. 9. FIG. 2 is a schematic configuration diagram of a bagmaking and packaging unit 100 of the bagmaking and packaging machine 1000. FIG. 3 is a schematic perspective view of a film supply unit 200 of the bagmaking and packaging machine 1000. FIG. 4 is a partially enlarged view of the film supply unit 200 in a state in which some members are removed so that a laser printing device 230 of the film supply unit 200 can be seen. FIG. 5 is a diagram schematically showing a conveyance path of the film F in the film supply unit 200. FIG. 6 depicts the film supply unit 200 in a state in which a maintenance door 264 is open. FIG. 7A is a drawing schematically depicting an example of a receiving member 240 of the film supply unit 200. FIG. 7B is a drawing schematically depicting another example of the receiving member 240 of the film supply unit 200. FIG. 8 is a control block diagram of the bagmaking and packaging machine 1000. FIG. 9 is a flowchart describing the operation of the bagmaking and packaging machine 1000 according to whether the maintenance door 264 is open or closed.

The bagmaking and packaging machine 1000, as shown in FIG. 1 and FIG. 8, mainly includes the film supply unit 200, the bagmaking and packaging unit 100, and a control unit 300. The bagmaking and packaging unit 100, the film supply unit 200, and the control unit 300 will be described below.

(2-1) Bagmaking and Packaging Unit

The bagmaking and packaging unit 100 receives the supply of the articles C from the combination weigher 2 and uses the film F supplied from the film supply unit 200 to make the bags B containing the articles C. The bagmaking and packaging unit 100 mainly includes, as shown in FIG. 1 and FIG. 2, a forming mechanism 10, a film conveyance device 20, a longitudinal sealing mechanism 30, and a transverse sealing mechanism 40.

(2-1-1) Forming Mechanism

The forming mechanism 10 mainly has, as shown in FIG. 2, a tube 12 and a former 14.

The tube 12 is a tubular member whose upper and lower ends are open. The articles C supplied by the combination weigher 2 are input to the opening in the upper end of the tube 12 (see FIG. 2).

The former 14 is disposed so as to surround the tube 12. The former 14 forms in a cylindrical shape the sheet-like film F conveyed thereto by the film supply unit 200. The film F that the former 14 has formed in the cylindrical shape will be called a cylindrical film Fc below.

(2-1-2) Film Conveyance Device

The film conveyance device 20 is disposed under the forming mechanism 10. The film conveyance device 20 conveys the film F, which is paid out from a film roll R retained by a later-described film roll retention unit 210 of the film supply unit 200. Below, the direction in which the film F is conveyed by the film conveyance device 20 will be called a conveyance direction A (see FIG. 2).

The film conveyance device 20 includes, as shown in FIG. 2 and FIG. 8, a pair of belts 26, a drive roller 22 and a follower roller 24 provided for each of the pair of belts 26, and a motor 28. The pair of belts 26 are disposed on the left and right sides of the tube 12 so as to sandwich the tube 12. The belts 26 have the function of sucking hold of the film F (the cylindrical film Fc). Each of the pair of belts 26 is entrained about the corresponding drive roller 22 and follower roller 24. When the drive rollers 22 are driven to rotate by the motor 28, the belts 26 convey downward the cylindrical film Fc they are sucking hold of. Furthermore, by virtue of the belts 26 conveying the cylindrical film Fc downward, the film conveyance device 20 conveys the film F in the conveyance direction A also upstream of the film conveyance device 20.

(2-1-3) Longitudinal Sealing Mechanism

The longitudinal sealing mechanism 30 seals the cylindrical film Fc along the conveyance direction A in the longitudinal direction (the up and down direction in FIG. 2) of the cylindrical film Fc.

The longitudinal sealing mechanism 30 is disposed on the front side of the tube 12 as shown in FIG. 2. The longitudinal sealing mechanism 30 is driven by a first drive unit 32 (see FIG. 8) such as a motor or an air cylinder to move in the front and rear direction toward or away from the tube 12. When the longitudinal sealing mechanism 30 moves toward the tube 12, an overlapping portion (seam) formed by the overlap of both edge portions of the cylindrical film Fc wrapped around the tube 12 becomes sandwiched between the longitudinal sealing mechanism 30 and the tube 12. The longitudinal sealing mechanism 30 uses a heater (not shown in the drawings) that the longitudinal sealing mechanism 30 has to heat-seal the overlapping portion of the film F in a state in which the longitudinal sealing mechanism 30 is sandwiching the overlapping portion of the film F between itself and the tube 12. It will be noted that ultrasonic sealing may also be used for the sealing method.

(2-1-4) Transverse Sealing Mechanism

The transverse sealing mechanism 40 seals the cylindrical film Fc along a direction intersecting the conveyance direction A (here, the left and right direction orthogonal to the conveyance direction A) in a state in which the articles C have been input to the cylindrical film Fc formed in the cylindrical shape, thus making a bag B containing the articles C.

The transverse sealing mechanism 40 has a pair of sealing jaws 42 and a second drive unit 44 such as a motor or an air cylinder (see FIG. 2 and FIG. 8).

The pair of sealing jaws 42 are disposed on the front side and the rear side of the cylindrical film Fc. The pair of sealing jaws 42 are driven at synchronized timings by a second drive unit 44 and are operated to move toward and away from each other. The pair of sealing jaws 42 clamp the cylindrical film Fc above the position where the articles C are present in the cylindrical film Fc at the timing when the articles C supplied by the combination weigher 2 fall to the vicinity of the lower end of the cylindrical film Fc. When the pair of sealing jaws 42 clamp the cylindrical film Fc, the transverse sealing mechanism 40 uses heaters built into the sealing jaws 42 to heat-seal the cylindrical film Fc in the direction orthogonal to the conveyance direction A. It will be noted that ultrasonic sealing may also be used for the sealing method.

One of the sealing jaws 42 has a built-in cutter (not shown in the drawings) inside. The transverse sealing mechanism 40, when transversely sealing the cylindrical film Fc, uses the cutter to cut the cylindrical film Fc in the height direction center position of the portion transversely sealed by the sealing jaws 42, thereby cutting the bag B containing the articles C away from the subsequent cylindrical film Fc.

(2-2) Film Supply Unit

The film supply unit 200, as in FIG. 1, is provided in back of and adjacent to the bagmaking and packaging unit 100 and supplies the sheet-like film F to the forming mechanism 10 of the bagmaking and packaging unit 100 (see FIG. 5).

The film supply unit 200 mainly has, as shown in FIG. 3 to FIG. 5, a film roll retention unit 210, a tension adjustment mechanism 220, a laser printing device 230, a moving device 238, a receiving member 240, plural rollers 250 that guide the film F, and a cover 260. Below, the film roll retention unit 210, the tension adjustment mechanism 220, the laser printing device 230, the moving device 238, the receiving member 240, and the cover 260 will be described.

(2-2-1) Film Roll Retention Unit

The film roll retention unit 210 is an example of a retention device for the film F. The film roll retention unit 210, as shown in FIG. 5, is disposed most upstream in the conveyance path of the film F in the bagmaking and packaging machine 1000 and retains a film roll R in which the sheet-like film F is wound around a roll core Rc. In other words, the film roll retention unit 210 retains the film F wound around the roll core Rc.

The film F of the film roll R is usually a multilayer sheet in which plural sheet-like members with different properties are adhered together. The layers configuring the film F have a printing layer on which printing is performed by the laser printing device 230. The film F includes a printed surface Fa and a non-printed surface Fb disposed on the reverse side thereof. The printed surface Fa is disposed on the outside when the bags B are made from the film F, and the non-printed surface Fb is disposed on the inside when the bags B are made from the film F. The non-printed surface Fb is an example of a first surface. On the printed surface Fa, predetermined patterns and characters, for example, may be repeatedly printed every predetermined length. The printed surface Fa also includes portions (called printing areas) in which predetermined information will be printed by the laser printing device 230. In contrast, on the non-printed surface Fb, usually nothing is printed.

The film roll retention unit 210 has a rotating shaft 212 on which the roll core Rc of the film roll R is mounted (see FIG. 3) and a roll drive unit 214 that causes the rotating shaft 212 to turn (see FIG. 8). The roll drive unit 214 is, for example, a motor. When the roll drive unit 214 is driven, the rotating shaft 212 turns, the film roll R also rotates, and the film F is paid out from the film roll R. The film F paid out from the film roll R is conveyed in the conveyance direction A by the film conveyance device 20.

The film F pulled out from the film roll R is guided by later-described movable rollers 222 and fixed rollers 224 of the tension adjustment mechanism 220 and the plural rollers 250 disposed along the conveyance path of the film F, and is conveyed to the forming mechanism 10 (see FIG. 5).

(2-2-2) Tension Adjustment Mechanism

The tension adjustment mechanism 220 adjusts the magnitude of tension acting on the conveyed film F.

The tension adjustment mechanism 220 mainly has movable rollers 222, fixed rollers 224, an arm 226, and an arm drive unit 228 (see FIG. 5 and FIG. 8).

The movable rollers 222 and the fixed rollers 224 are all freely rotating rollers. The fixed rollers 224 are fixed to a frame of the bagmaking and packaging machine 1000 and do not change position. The movable rollers 222 are attached to end portions of the arm 226, which is rotatably attached to the frame of the bagmaking and packaging machine 1000, and the position of the movable rollers 222 is variable. The film F is, as in FIG. 5, alternately entrained about the movable rollers 222 and the fixed rollers 224 in the order of a fixed roller 224, a movable roller 222, a fixed roller 224, a movable roller 222, and a fixed roller 224 and is guided by these rollers. It will be noted that the numbers of the fixed rollers 224 and the movable rollers 222 shown in FIG. 5 are exemplary, and the numbers of the fixed rollers 224 and the movable rollers 222 may be decided as appropriate.

The arm drive unit 228 is, for example, an air cylinder or a motor. The arm drive unit 228 adjusts the position of the movable rollers 222 attached to the arm 226 to control the magnitude of tension acting on the film F by causing force to act so that the arm 226 pivots.

(2-2-3) Laser Printing Device and Moving Device

The laser printing device 230 is a device that prints on the printed surface Fa of the film F. The laser printing device 230 performs printing by continuously oscillating laser light, simultaneously moving the spot of the laser light, and emitting the laser light to the film F.

The moving device 238 is a device that moves the laser printing device 230 in the left and right direction orthogonal to the conveyance direction A to change, in the left and right direction, a printing position of the laser printing device 230 relative to the printed surface Fa of the film F. In the present embodiment, the moving device 238 is a device that automatically moves the laser printing device 230, and its operation is controlled by the later-described control unit 300 based on information relating to the printing position input to the touch panel display 4 or the like. However, the moving device 238 is not limited to this and may be a device that is manually operated by the operator of the bagmaking and packaging machine 1000 to move the laser printing device 230.

The laser printing device 230 mainly has a laser emitter 232, a mirror drive motor 234, and a printing device control unit 236.

The laser emitter 232 emits the laser light. In the present embodiment, the laser light emitted by the laser emitter 232 is UV laser light. However, the type of the laser light may also be $CO_2$ laser light or fiber laser light. The mirror drive motor 234 drives a scanning mirror (not shown in the drawings) for scanning the laser light.

The moving device 238 moves the laser printing device 230 (an optical mechanism 233 including the laser emitter 232, the scanning mirror, and the mirror drive motor 234) in the left and right direction (a direction parallel to the printed surface Fa of the film F, a direction orthogonal to the conveyance direction A of the film F). For example, the moving device 238 moves the optical mechanism 233 in the left and right direction by means of a mechanism such as a ball screw driven by a drive unit such as a motor (not shown in the drawings). The moving device 238 changes, in the left and right direction, the printing position of the laser printing device 230 relative to the printed surface Fa of the film F by moving the laser printing device 230 (more specifically, the optical mechanism 233) in the left and right direction. As a result, even if the left and right direction width of the film F used by the bagmaking and packaging machine 1000 and the position of the printing areas in the width direction of the film F change, the moving device 238 can accommodate the change.

The printing device control unit 236 is a control device including a CPU, a storage unit such as a main memory unit and an auxiliary memory unit, and various types of electrical circuits and electronic circuits. The printing device control unit 236 controls the operations of the laser emitter 232 and the mirror drive motor 234. The CPU of the printing device control unit 236 executes programs stored in the storage unit and controls the operation of the mirror drive motor 72 based on printing data stored in the storage unit to scan the laser light by means of the scanning mirror and print predetermined printing content (e.g., the date of manufacture of the articles C, etc.) in the printing areas of the conveyed film F. Specifically, the CPU of the printing device control unit 236 controls the operation of the mirror drive motor 234 based on the printing data stored in the storage unit to change the direction of the laser light by means of the scanning mirror, cause the laser light to follow a predetermined path, and cause the printing layer of the film F in the position struck by the laser light to produce color. It will be noted that the printing data include information such as which path the laser light is to be made to follow (information such as which characters and symbols to print). The printing data are data input from, for example, the touch panel display 4 and/or an input unit (not shown in the drawings) that the laser printing device 230 has.

The laser printing device 230 is, as in FIG. 5, disposed on the rear side of the conveyed film F. When the film F passes in front of the laser printing device 230, the printed surface Fa of the film F faces rearward (faces the laser printing device 230). The laser printing device 230, as in FIG. 5, emits the laser light toward the printing areas of the printed surface Fa of the film F that bridges a roller 252 and a roller 254 and is conveyed in front of the laser printing device 230.

(2-2-4) Receiving Member

The receiving member 240 is disposed so as to oppose the non-printed surface Fb on the opposite side (reverse side) of the printed surface Fa of the conveyed film F.

The receiving member 240 has a reflection suppressing surface 242 that suppresses regular reflection of the laser light that has been emitted by the laser printing device 230 and passed through the film F. Reasons for providing the receiving member 240 having the reflection suppressing surface 242 in the bagmaking and packaging machine 1000 are as follows.

If the laser light that has been emitted by the laser printing device 230 and passed through the film F were to be regularly reflected, and if it were by chance to strike a person's eyes, the reflected laser light would have the potential to have an adverse effect on the person's eyes. It will be noted that regular reflection here means reflection where the angle of incidence and the angle of reflection are equal at the surface (reflection surface) struck by the laser light.

To address this, in the bagmaking and packaging machine 1000, the receiving member 240 is disposed in a position opposing the non-printed surface Fb on the opposite side of the printed surface Fa of the film F, and the receiving member 240 is provided with the reflection suppressing surface 242 that suppresses regular reflection of the laser light. For that reason, in this bagmaking and packaging machine 1000, the occurrence of a situation where the laser light that has passed through the film F is reflected and has an effect on a person's eyes can be suppressed.

It will be noted that it is preferred that the reflection suppressing surface 242 absorb, without regularly reflecting, most of the laser light that has passed through the film F and reached the reflection suppressing surface 242.

Furthermore, the reflection suppressing surface 242 may be a surface that diffusely reflects, rather than regularly reflects, most of the laser light that has passed through the film F and reached the reflection suppressing surface 242. It will be noted that diffuse reflection is a type of reflection in which incident light is irregularly reflected by the reflection surface and is reflected in various directions. Also in a case where the laser light is diffusely reflected by the reflection suppressing surface 242, the effect on a person's eyes can be reduced compared to a case where the light is regularly reflected.

The receiving member 240 having the reflection suppressing surface 242 may, for example, have the following structures.

First Example

In a first example, the receiving member 240 includes a main body portion 241a made of metal (e.g., made of stainless steel or made of aluminum) and a resin portion 241b (the hatched portion) attached to the main body portion 241a (see FIG. 7A). The resin portion 241b of the receiving member 240 opposes the non-printed surface Fb of the film F bridging the roller 252 and the roller 254 as in FIG. 5. In other words, the resin portion 241b of the receiving member 240 has the reflection suppressing surface 242.

In this way, by providing the resin portion 241b that generally has a higher laser light absorptance than metal, the laser light can be absorbed by the resin portion 241b, and regular reflection of the laser light at the reflection suppressing surface 242 can be suppressed.

The material of the resin portion 241b is, for example, polyacetal (POM). However, the material of the resin portion 241b is not limited to POM and, for example, may also be a fluoropolymer, glass epoxy, polyimide, or polycarbonate. It will be noted that the laser light absorptance of each resin will change depending on the wavelength of the laser light, so the material of the resin portion 241b may be selected in accordance with the type of the laser printing device 230 that is used.

It will be noted that in the first example the receiving member 240 need not have the main body portion 241a made of metal. For example, as long as there are no problems in terms of strength, the receiving member 240 may entirely comprise the resin portion 241b.

Second Example

In a second example, the reflection suppressing surface 242 of the receiving member 240 is formed by subjecting the surface of a base material 243 made of metal (e.g., made of stainless steel or made of aluminum) to a regular reflection suppression process. That is, the receiving member 240 has a regular reflection suppression processed surface as the reflection suppressing surface 242.

The regular reflection suppression process is, for example, a process that treats the base material 243 with a process such as blasting to form the reflection suppressing surface 242 having a rough surface roughness. By providing this kind of reflection suppressing surface 242, the laser light that has reached the reflection suppressing surface 242 can be diffusely reflected.

Furthermore, the regular reflection suppression process here may, as in FIG. 7B, be a process that applies a fluoropolymer coating, for example, to the base material 243 made of metal to form a fluoropolymer coating layer 243a (the hatched portion), thereby providing on the surface of the base material 243 the reflection suppressing surface 242 that has a higher laser light absorptance than the base material 243.

(A) Disposition of Reflection Suppressing Surface

As mentioned above, in the present embodiment, the laser printing device 230 is moved in the left and right direction by the moving device 238. In other words, in the present embodiment, the position where the laser printing device 230 emits the laser light changes in the left and right direction. Here, in order to suppress the occurrence of a situation where, even when the position of the laser printing device 230 in the left and right direction changes, the laser light that has passed through the film F during printing does not strike the reflection suppressing surface 242 but is reflected by some member and has an effect on a person's eyes, the reflection suppressing surface 242 opposes the entire non-printed surface Fb of the film F in the left and right direction at the height position where the laser printing device 230 emits the laser light.

It will be noted that in a case where the bagmaking and packaging machine 1000 does not have the moving device 238 and the position of the laser printing device 230 does not change in the left and right direction, the reflection suppressing surface 242 may be disposed just in the position corresponding to the region where the laser light can be emitted to the film F in the left and right direction.

Furthermore, preferably, the reflection suppressing surface 242 of the receiving member 240 at least partially contacts the non-printed surface Fb of the film F conveyed in the conveyance direction A. More preferably, the entire reflection suppressing surface 242 contacts the non-printed surface Fb in the left and right direction when the film F passes the position adjacent to the reflection suppressing surface 242. To realize this kind of structure, for example, the front end of the roller 252 and the rear end of the roller 254 may be disposed more forward than the reflection suppressing surface 242 of the receiving member 240.

When the film supply unit 200 is configured in this way so that the reflection suppressing surface 242 at least partially contacts the non-printed surface Fb, the reflection suppressing surface 242 can apply tension to the film F. As a result, in the bagmaking and packaging machine 1000 of the above embodiment, the movement of the film F can be regulated, and vibration of the film F and fluttering caused by the effect of a draft or the like can be suppressed. As a result, when the laser printing device 230 emits the laser light toward the film F (toward the reflection suppressing surface 242) and performs the printing, the occurrence of problems such as deviations in the printing position is easily suppressed.

It will be noted that the non-printed surface Fb of the film F is a surface disposed on the inside of the bags B. For that reason, in a case where the articles C are foods and the reflection suppressing surface 242 is allowed to contact the non-printed surface Fb, it is preferred that a material complying with the Food Sanitation Act be used for the material of the reflection suppressing surface 242.

(2-2-5) Cover

The cover 260 is disposed around the laser printing device 230 and obstructs passage of the laser light emitted by the laser printing device 230. Because the film supply unit 200 has the kind of receiving member 240 mentioned above, the adverse effects of the laser light on a person's eyes can be reduced, but by surrounding the laser printing device 230 with the cover 260, an even higher level of safety can be realized.

For example, in the present embodiment, the cover 260 includes, as in FIG. 3, a top panel 262 that covers the top side of the laser printing device 230, a maintenance door 264 that covers the right side of the laser printing device 230, and a side panel (not shown in the drawings) that covers the left side of the laser printing device 230. FIG. 4 depicts the cover 260 in a state in which the top panel 262 is removed. It will be noted that the cover 260 may, as needed, include members that cover the bottom side, the front side, and the rear side of the laser printing device 230.

The top panel 262 here is a panel member made of metal, although this is not intended to limit its material. As schematically shown in FIG. 5, the top panel 262 is disposed between the laser printing device 230 and the conveyance path of the film F above the laser printing device 230 (in FIG. 5, the conveyance path of the film F conveyed between the fixed roller 224 most downstream in the conveyance direction A in the tension adjustment mechanism 220 and the roller 252).

The maintenance door 264 is a member comprising a base material made of metal in which an opening is provided, and the opening is covered by a first member 264a made of transparent polycarbonate so that the inside of the cover 260 can be observed. The thickness of the first member 264a is decided so that, even if the laser light were to be guided to the opening of the maintenance door 264, the laser light would not pass through the first member 264a. The side panel covering the left side of the laser printing device 230 also has the same structure as the maintenance door 264 except that it is not a door (does not open like a door).

The maintenance door 264 is a door provided for maintenance of the various configurations of the film supply unit 200 including the laser printing device 230. The maintenance door 264 can assume a closed state as in FIG. 4 and an open state as in FIG. 6. The maintenance door 264 is provided with an open/closed detector 266 that detects whether the maintenance door 264 is open or closed. The open/closed detector 266 is, for example, a magnetic proximity sensor, although this is not intended to limit the type of the detector.

(2-3) Control Device

The control unit 300 includes, for example, a CPU, a storage unit such as a main memory unit and an auxiliary memory unit, and various types of electrical circuits and electronic circuits. In the present embodiment, the control unit 300 is a device that controls the operations of the combination weigher 2 and the bagmaking and packaging machine 1000. However, the control unit 300 may be a device that controls only the bagmaking and packaging machine 1000. The weighing, bagmaking, and packaging system 1 may also have a control device, separate from the control unit 300, that controls the combination weigher 2.

The control unit 300 is connected to the respective configurations of the combination weigher 2 and configures part of the combination weigher 2 as a control unit of the combination weigher 2. Furthermore, the control unit 300 is electrically connected to the respective configurations of the film supply unit 200 and the respective configurations of the bagmaking and packaging unit 100 of the bagmaking and packaging machine 1000 (see FIG. 8). The configurations of the bagmaking and packaging machine 1000 electrically connected to the control unit 300 include the motor 28 of the film conveyance device 20, the first drive unit 32 of the longitudinal sealing mechanism 30, the second drive unit 44 of the transverse sealing mechanism 40, the roll drive unit 214 of the film roll retention unit 210, the arm drive unit 228 of the tension adjustment mechanism 220, the printing device control unit 236 of the laser printing device 230, the moving device 238, and the open/closed detector 266.

The control unit 300, for example, controls the motions of the combination weigher 2 and the bagmaking and packaging machine 1000 so that the combination weigher 2 and the bagmaking and packaging machine 1000 perform the following operations.

The control unit 300 controls the operations of the various configurations of the combination weigher 2 so that the weights of the articles C are measured by each of the plural weigh hoppers 2a, a combination of the weigh hoppers 2a whereby the sum of the weigh values of the weigh hoppers 2a becomes a predetermined weight is selected, and the weigh hoppers 2a selected for the combination discharge the articles C downward. The articles C discharged by the combination weigher 2 are dropped into the opening in the upper end of the tube 12 of the bagmaking and packaging machine 1000.

Furthermore, the control unit 300 controls the roll drive unit 214 and the arm drive unit 228 of the film supply unit 200 so that the film F is supplied to the forming mechanism 10. Furthermore, when the film F is conveyed in the film supply unit 200, the control unit 300 sends a command to the printing device control unit 236 of the laser printing device 230 to print the predetermined information in the predetermined printing areas of the film F. Furthermore, in the bagmaking and packaging unit 100, the control unit 300 controls the operation of the film conveyance device 20 so that the film F is conveyed in the conveyance direction A and controls the longitudinal sealing mechanism 30 so that the seam of the conveyed cylindrical film Fc is sealed in the longitudinal direction. Moreover, the control unit 300 controls the transverse sealing mechanism 40 so that the sealing jaws 42 transversely seal the cylindrical film Fc in a state in which the articles C are present in the lower end portion of the cylindrical film Fc and the cutting mechanism (not shown in the drawings) cuts the sealed bag B away from the upstream cylindrical film Fc.

<Control of Operation of Bagmaking and Packaging Machine 1000 According to Whether Maintenance Door 264 is Open or Closed>

If the bagmaking and packaging machine 1000 is operated in a state in which the maintenance door 264 is open and the laser emitter 232 of the laser printing device 230 emits the laser light, the laser light has the potential to leak to the outside of the film supply unit 200.

Thus, the control unit 300 controls the operation of the bagmaking and packaging machine 1000 as in the flowchart of FIG. 9. It will be noted that, as a premise of the description, it will be assumed that the operation of the bagmaking and packaging machine 1000 is stopped.

First, the control unit 300 determines whether a command to start operation has been input via the touch panel display 4 or the like (step S1). In a case where it is determined that a command to start operation has been input, the process proceeds to step S2, and in a case where it is determined that a command to start operation has not been input, the process returns to step S1.

In step S2, the control unit 300 determines whether or not the maintenance door 264 is open based on the detection result of the open/closed detector 266.

In a case where the open/closed detector 266 is detecting that the maintenance door 264 is closed, the control unit 300 starts the operation of the bagmaking and packaging machine 1000 (step S3). The operation of the bagmaking and packaging machine 1000 also includes the emission of the laser light by the laser printing device 230 at a predetermined timing. In short, when the maintenance door 264 is closed, the control unit 300 sends an operation command to the printing device control unit 236 of the laser printing device 230.

In a case where, in step S2, the open/closed detector 266 is detecting that the maintenance door 264 is open, the control unit 300 prohibits the operation of the bagmaking and packaging machine 1000, and the process returns to step S1. The prohibition on the operation of the bagmaking and packaging machine 1000 also includes a prohibition on the emission of the laser light by the laser printing device 230. In short, when the maintenance door 264 is open, the control unit 300 does not send an operation command to the printing device control unit 236 of the laser printing device 230.

Also after the bagmaking and packaging machine 1000 starts operating, the control unit 300 determines whether or not the maintenance door 264 is open based on the detection result of the open/closed detector 266 (step S4). This process is repeated until the open/closed detector 266 detects that the maintenance door 264 is open or until a command to stop operating is input via the touch panel display 4 or the like (not shown in FIG. 9).

In a case where, in step S4, the open/closed detector 266 is detecting that the maintenance door 264 is open, the control unit 300 stops the operation of the bagmaking and packaging machine 1000 (step S5). Stopping the operation of the bagmaking and packaging machine 1000 also includes stopping the emission of the laser light by the laser printing device 230. In short, when the maintenance door 264 is open, the control unit 300 sends a command to stop operating to the printing device control unit 236 of the laser printing device 230.

(4) Characteristics of Bagmaking and Packaging Machine (4-1)

The bagmaking and packaging machine 1000 of the above embodiment uses the film F to package the articles C. The bagmaking and packaging machine 1000 includes the laser printing device 230 and the receiving member 240. The laser printing device 230 prints on the printed surface Fa of the film F. The receiving member 240 is disposed so as to oppose the non-printed surface Fb, which is an example of a first surface, on the opposite side of the printed surface Fa of the film F. The receiving member 240 has the reflection suppressing surface 242. The reflection suppressing surface 242 suppresses regular reflection of the laser light emitted by the laser printing device 230.

In the bagmaking and packaging machine 1000, the receiving member 240 is disposed in a position opposing the non-printed surface Fb on the opposite side of the printed surface Fa of the film F, and the receiving member 240 is provided with the reflection suppressing surface 242 that suppresses regular reflection of the laser light. For that reason, in this bagmaking and packaging machine 1000, the occurrence of a situation where the laser light that has passed through the film F is reflected and has an effect on a person's eyes can be reduced.

(4-2)

The receiving member 240 of the bagmaking and packaging machine 1000 includes, for example, the resin portion 241b having the reflection suppressing surface 242.

In a case where the receiving member 240 is configured in this way, the resin portion 241b, which generally has a higher laser light absorptance than metal, absorbs the laser light, so that regular reflection of the laser light can be suppressed at the reflection suppressing surface 242 of the receiving member 240.

(4-3)

In another example, the receiving member 240 of the bagmaking and packaging machine 1000 may have a regular reflection suppression processed surface as the reflection suppressing surface 242. The regular reflection suppression processed surface is a surface to which a process to reduce the regular reflection is performed.

In a case where the receiving member 240 is configured in this way, it is not necessary to prepare both a member having the reflection suppressing surface and a main body member that supports that member, and the number of parts of the bagmaking and packaging machine 1000 can be reduced.

(4-4)

The bagmaking and packaging machine 1000 includes the film conveyance device 20, the film roll retention unit 210, which is an example of a retention device for the film F, and the control unit 300. The film conveyance device 20 conveys the film F in the conveyance direction A. The film roll retention unit 210 is disposed upstream of the laser printing device 230 in the conveyance direction A. The control unit 300 controls the operation of the film conveyance device 20.

(4-5)

The bagmaking and packaging machine 1000 includes the moving device 238.

The moving device 238 moves the laser printing device 230 in the left and right direction—which is an example of a first direction—orthogonal to the conveyance direction A to change, in the left and right direction, the printing position of the laser printing device 230 relative to the printed surface Fa of the film F. It is preferred that the reflection suppressing surface 242 of the receiving member 240 oppose the entire non-printed surface Fb of the film F in the left and right direction.

In the bagmaking and packaging machine 1000 of the above embodiment, because the moving device 238 moves the laser printing device 230 in the left and right direction, the laser printing device 230 can print various types of printing content in desired positions in the left and right direction of the film F.

Furthermore, as the reflection suppressing surface 242 opposes in the left and right direction the entire non-printed surface Fb of the film F used by the bagmaking and packaging machine 1000, even in a case where the laser printing device 230 has been moved in the left and right direction to change the printing position in the left and right direction, the occurrence of a situation where the laser light that has passed through the film F during printing is reflected by some member without striking the reflection suppressing surface 242 and has an effect on a person's eyes can be suppressed.

(4-6)

In the bagmaking and packaging machine 1000, it is preferred that the reflection suppressing surface 242 of the receiving member 240 at least partially contact the non-printed surface Fb of the film F conveyed in the conveyance direction A.

In the bagmaking and packaging machine 1000 of the above embodiment, as the non-printed surface Fb of the film F is made to contact the reflection suppressing surface 242, tension can be applied by the reflection suppressing surface 242 to the film F. As a result, in the bagmaking and packaging machine 1000 of the above embodiment, the movement of the film F can be regulated, and vibration of the film F and fluttering caused by the effect of a draft or the like can be suppressed. As a result, when the laser printing device 230 emits the laser light toward the film F (toward the reflection suppressing surface 242) to perform printing, the occurrence of problems such as deviations in the printing position is easily suppressed.

(4-7)

The bagmaking and packaging machine 1000 includes the former 14 and the transverse sealing mechanism 40. The former 14 and the transverse sealing mechanism 40 are disposed downstream of the laser printing device 230 in the conveyance direction A of the film F. The former 14 forms the conveyed film F in a cylindrical shape. The transverse sealing mechanism 40 seals the cylindrical film Fc in a direction intersecting the conveyance direction A in a state in which the articles C have been input to the film F formed in the cylindrical shape (the cylindrical film Fc).

(4-8)

It is preferred that the bagmaking and packaging machine 1000 include the cover 260 that is disposed around the laser printing device 230 and obstructs passage of the laser light emitted by the laser printing device 230.

In this bagmaking and packaging machine 1000, in addition to having the reflection suppressing surface 242, the cover 260 is disposed around the laser printing device 230, so compared to a case where the cover 260 is not provided, the level of safety of the bagmaking and packaging machine 1000 can be enhanced even more.

(4-9)

In the bagmaking and packaging machine 1000 of the above embodiment, the cover 260 includes the maintenance door 264 for the laser printing device 230. The bagmaking and packaging machine 1000 includes the open/closed detector 266, which is an example of a detector, and the printing device control unit 236, which is an example of an emission control unit. The open/closed detector 266 detects whether the maintenance door 264 is open or closed. The printing device control unit 236 controls the emission of the laser light by the laser printing device 230. It is preferred that the printing device control unit 236 stop the emission of the laser light by the laser printing device 230 in a case where the open/closed detector 266 is detecting that the maintenance door 264 is open. Furthermore, it is preferred that the control unit 300 stop the operation of the bagmaking and packaging machine 1000 in a case where the open/closed detector 266 is detecting that the maintenance door 264 is open.

In this bagmaking and packaging machine 1000, the emission of the laser light is stopped in a case where the maintenance door 264 serving as the cover 260 is open, so a high level of safety for the bagmaking and packaging machine 1000 can be realized.

(5) Example Modifications

An embodiment of the present invention has been described above, but the present invention is not limited to the above embodiment, and various changes may be made thereto without departing from the spirit of the invention.

(5-1) Example Modification A

In the above embodiment, a case where the packaging apparatus is a type of bagmaking and packaging machine 1000 called a vertical pillow packaging machine was described as an example, but the type of the packaging apparatus is not limited to a vertical pillow packaging machine. The packaging apparatus of the present invention is applicable to various types of packaging apparatus that use a film to package articles, such as, for example, a horizontal pillow packaging machine that uses a film to package articles conveyed in a horizontal direction.

(5-2) Example Modification B

In the above embodiment, the operation of the laser printing device 230 is not directly controlled by the control unit 300 but is controlled by the printing device control unit 236, which is separate from the control unit 300 and exchanges signals with the control unit 300. However, the laser printing device 230 is not limited to this, and the operation of the laser printing device 230 may also be directly controlled by the control unit 300.

Second Embodiment

A bagmaking and packaging machine 1000A pertaining to a second embodiment of the packaging apparatus of the present invention will now be described with reference to FIG. 10 to FIG. 15.

The bagmaking and packaging machine 1000A of the second embodiment differs from the bagmaking and packaging machine 1000 pertaining to the first embodiment mainly in that the receiving member 240 is movable. Here, mainly content relating to the receiving member 240 of a film supply unit 200A of the bagmaking and packaging machine 1000A being movable will be described, and description of other content will be omitted unless otherwise necessary.

Furthermore, the weighing, bagmaking, and packaging system including the bagmaking and packaging machine 1000A is the same as the weighing, bagmaking, and packaging system 1 pertaining to the first embodiment of the packaging apparatus of the present invention except that the bagmaking and packaging machine differs in the above respect. Therefore, description except the bagmaking and packaging machine 1000A will be omitted here.

(1) Moving Device of Laser Printing Device

The laser printing device 230 and the moving device 238 of the film supply unit 200A are generally the same as the laser printing device 230 and the moving device 238 of the film supply unit 200 of the first embodiment.

Figure 10:
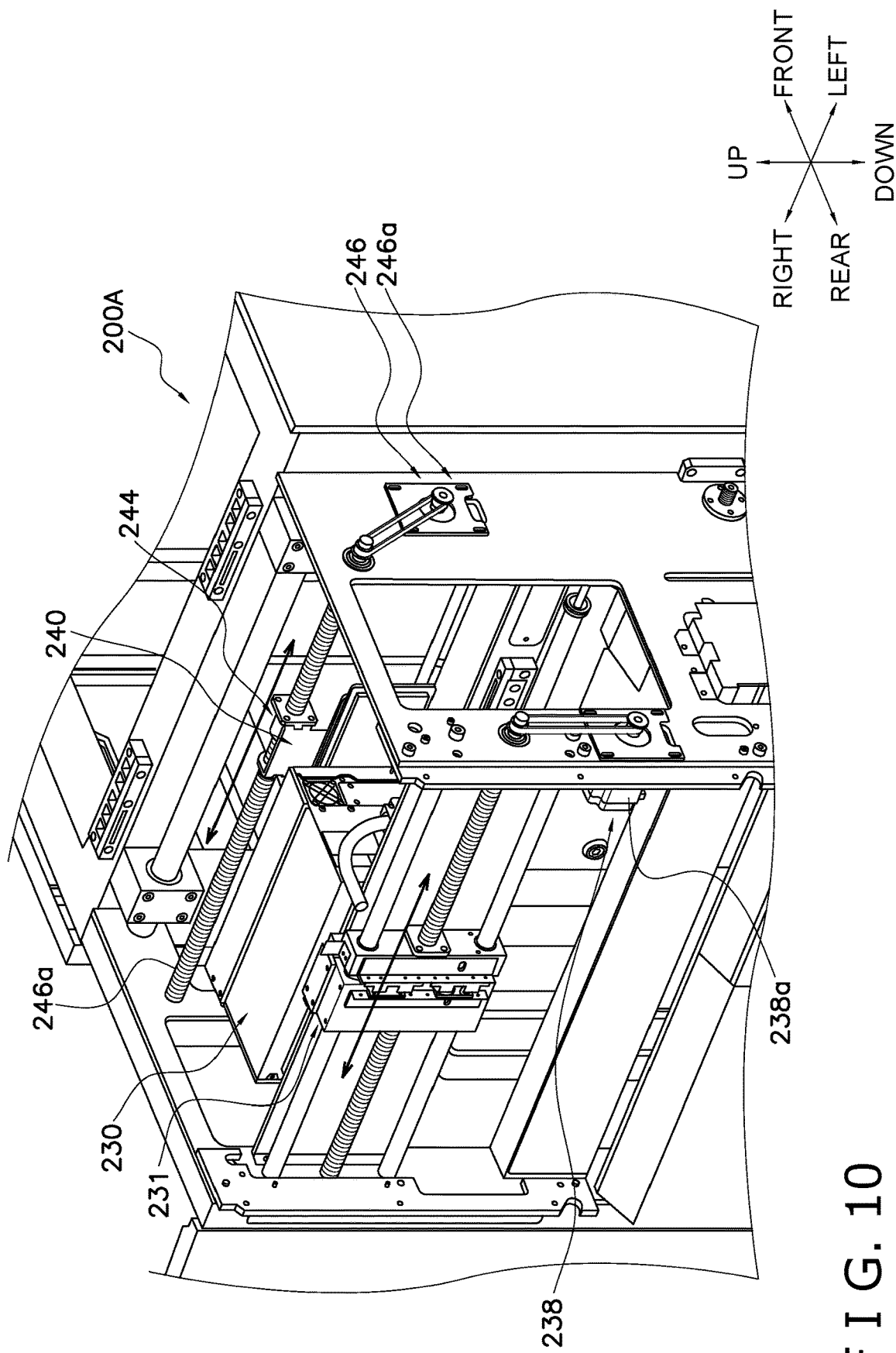
FIG. 10 is a perspective view of the area around the laser printing device of a film supply unit of a bagmaking and packaging machine pertaining to a second embodiment of the packaging apparatus of the invention, and depicts a state in which some members are removed so that the laser printing device and the receiving member can be seen.
Figure 11:
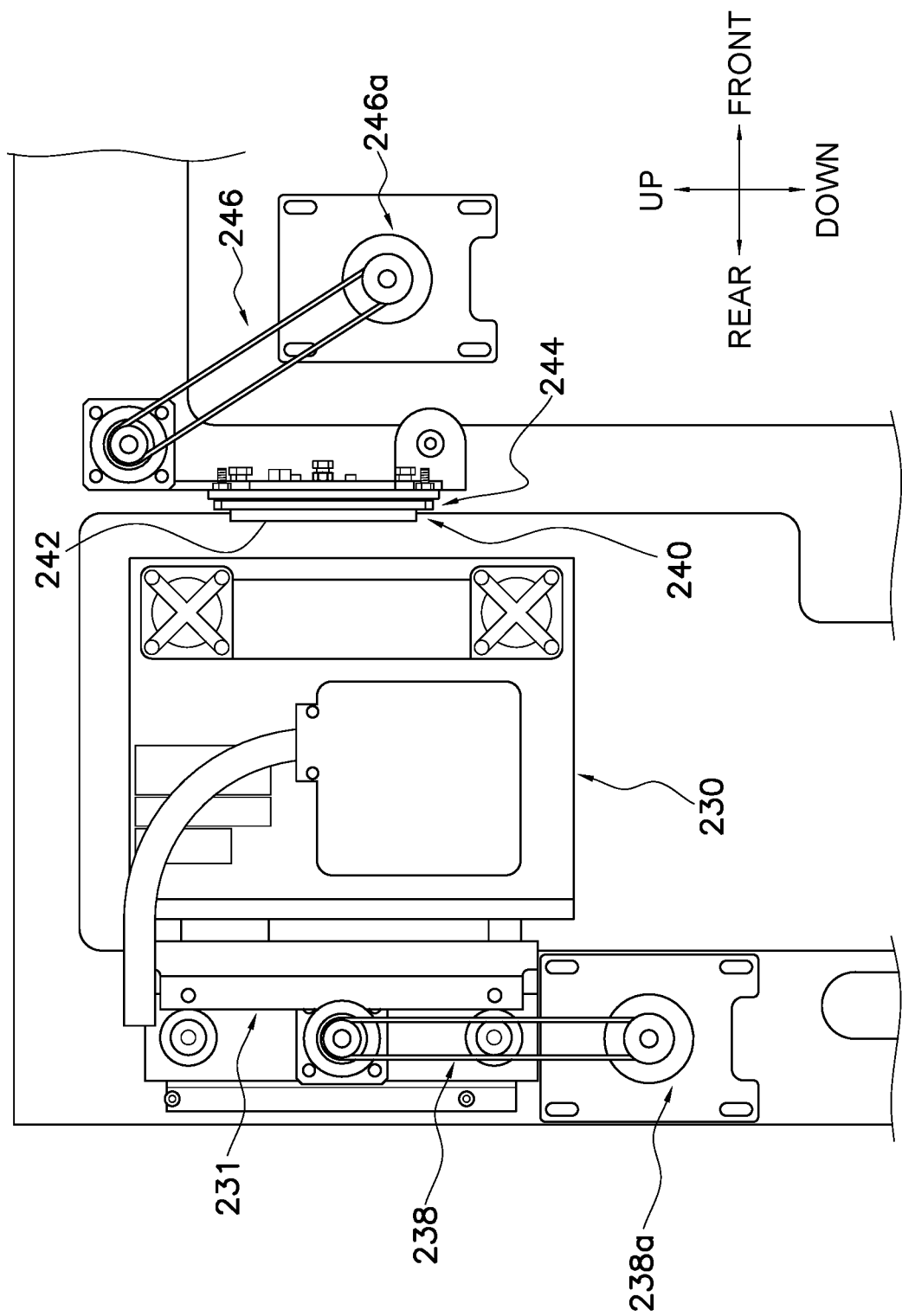
FIG. 11 is a side view of the area around the laser printing device of the film supply unit of FIG. 10, and depicts a state in which some members are removed so that the laser printing device and the receiving member can be seen.

The moving device 238 of the film supply unit 200A of the second embodiment is, for example, a ball screw mechanism such as shown in FIG. 10 and FIG. 11 that uses a motor 238a to move an attachment member 231 to which the laser printing device 230 is attached. The moving device 238 moves the laser printing device 230 in the left and right direction orthogonal to the conveyance direction A. The operation of the moving device 238 is controlled by a later-described control unit 300 based on printing information input to, for example, the touch panel display 4 or the like.

It will be noted that although here the control unit 300 controls the operation of the moving device 238, in a case where it is not necessary to move the position of the laser printing device 230 while the bagmaking and packaging machine 1000A is operating, the moving device 238 may be a device that is manually (not automatically) operated by the operator of the bagmaking and packaging machine 1000A to move the laser printing device 230.

(2) Receiving Member and Receiving Member Moving Device

The receiving member 240 of the film supply unit 200A is, like the receiving member 240 of the first embodiment, disposed so as to oppose the non-printed surface Fb on the opposite side (reverse side) of the printed surface Fa of the conveyed film F. The receiving member 240 is, for example, a tabular member.

The reasons for providing the receiving member 240 having the reflection suppressing surface 242 and the structure of the reflection suppressing surface 242 are the same as in the first embodiment, so description will be omitted here.

The receiving member 240 of the second embodiment is, in contrast to the immovable receiving member 240 of the first embodiment, a member that is moved by a receiving member moving device 246.

The receiving member moving device 246 includes, for example, as shown in FIG. 10 and FIG. 11, a ball screw mechanism that uses a motor 246a to drive an attachment member 244 to which the receiving member 240 is attached. The receiving member moving device 246 moves the receiving member 240 in the left and right direction (the same as the direction in which the laser printing device 230 is moved by the moving device 238) orthogonal to the conveyance direction A. The operation of the receiving member moving device 246 is controlled by the later-described control unit 300.

It will be noted that although here the control unit 300 controls the operation of the receiving member moving device 246, in a case where it is not necessary to move the receiving member 240 while the bagmaking and packaging machine 1000A is operating, the receiving member moving device 246 may be a device that is manually (not automatically) operated by the operator of the bagmaking and packaging machine 1000A to move the receiving member 240.

In a case where the receiving member moving device 246 is controlled by the control unit 300, the control unit 300 moves the reflection suppressing surface 242 of the receiving member 240 to a position opposing the region where the laser printing device 230 emits the laser light (i.e., the printing position of the laser printing device 230) by operating the receiving member moving device 246 to move the receiving member 240 in the same direction as the direction in which the laser printing device 230 is moved by the moving device 238 when the moving device 238 moves the laser printing device 240. In other words, by controlling the operations of the moving device 238 and the receiving member moving device 246, the control unit 300 causes the region where the laser printing device 230 emits the laser light (hereinafter simply called "the laser emission region") and the reflection suppressing surface 242 of the receiving member 240 to oppose each other.

The control unit 300, for example, moves the receiving member 240 and the laser printing device 230 at the same time. However, the control unit 300 is not limited to this and may move the receiving member 240 and the laser printing device 230 at different timings as long as the laser emission region and the reflection suppressing surface 242 of the receiving member 240 can oppose each other at the timing when the laser printing device 230 emits the laser light.

In the bagmaking and packaging machine 1000A of the second embodiment, because the receiving member 240 is moved by the receiving member moving device 246, the size of the receiving member 240 need only be a size corresponding to the laser emission range of the laser printing device 230. For that reason, in the bagmaking and packaging machine 1000A of the second embodiment, the size of the receiving member 240 in the left and right direction can be smaller than the width of the film F in the left and right direction.

It will be noted that the receiving member moving device 246 may move the receiving member 240 so that the laser emission region and the reflection suppressing surface 242 of the receiving member 240 oppose each other at the timing when the moving device 238 moves the laser printing device 230 not only when adjusting the printing position of the laser printing device 230 but also during maintenance or the like. Alternatively, the receiving member moving device 246 may move the receiving member 240 independently of the moving device 238 during maintenance or the like (at a timing when the moving device 238 does not move the laser printing device 230).

The laser printing device 230 and the receiving member 240 may, depending on their dispositions, hinder maintenance work. To address this, as the moving device 238 and the receiving member moving device 246 controlled by the control unit 300, or the moving device 238 and the receiving member moving device 246 manually operated by the operator of the bagmaking and packaging machine 1000A, move the laser printing device 230 and the receiving member 240 to positions desired by the operator, the possibility that the laser printing device 230 and the receiving member 240 hinders maintenance work can be reduced.

Also, in the second embodiment, the reflection suppressing surface 242 of the receiving member 240 preferably at least partially contacts the non-printed surface Fb of the film F conveyed in the conveyance direction A. The reason it is preferred that the reflection suppressing surface 242 of the receiving member 240 contact the non-printed surface Fb and the configuration for allowing the reflection suppressing surface 242 of the receiving member 240 to contact the non-printed surface Fb are the same as in the first embodiment.

(3) Relative Position Detection Unit

The film supply unit 200A includes a relative position detection unit 400 that detects the relative positions of the laser printing device 230 and the reflection suppressing surface 242 of the receiving member 240.

The relative position detection unit 400 is, for example, a device that has a magnet and a magnetic sensor and detects whether the magnet is disposed in a position near the magnetic sensor based on whether or not the magnetic sensor detects the magnetism of the magnet.

The control unit 300 determines, based on the detection result of the relative position detection unit 400, whether or not the region where the laser printing device 230 emits the laser light and the reflection suppressing surface 242 of the receiving member 240 are opposing each other. Furthermore, in another configuration, the printing device control unit (emission control unit) 246 may determines, based on the detection result of the relative position detection unit 400, whether or not the region where the laser printing device 230 emits the laser light and the reflection suppressing surface 242 of the receiving member 240 are opposing each other.

For example, as shown in FIG. 12, a magnetic sensor 402 of the relative position detection unit 400 is attached to the receiving member 240, and a magnet 404 of the relative position detection unit 400 is attached to the laser printing device 230. The position where the magnetic sensor 402 is attached to the receiving member 240 and the position where the magnet 404 is attached to the laser printing device 230 are decided so that, for example, in a case where the magnetic sensor 402 detects the magnet 404, the laser emission region and the reflection suppressing surface 242 are in an opposing state. It will be noted that the arrangement of the magnet and the magnetic sensor may also be reversed.

Furthermore, for example, as shown in FIG. 13, the magnet 404 may be attached to a first member (e.g., a first member 410 attached to the laser printing device 230) that is moved together with the laser printing device 230 by the moving device 238, and magnetic sensor 402 may be attached to a second member (e.g., a second member 420 attached to the receiving member 240) that is moved together with the receiving member 240 by the receiving member moving device 246.

It will be noted that the first member 410 need not be attached to the laser printing device 230 as long as it is a member that is moved together with the laser printing device 230 by the moving device 238. Furthermore, the second member 420 need not be attached to the receiving member 240 as long as it is a member that is moved together with the receiving member 240 by the receiving member moving device 246.

Moreover, the structure of FIG. 12 and the structure of FIG. 13 may be combined. For example, the magnet 404 may be attached to the laser printing device 230, and the magnetic sensor 402 may be attached to the second member 420.

It will be noted that the relative position detection unit 400 may be realized by something other than a combination of a magnet and a magnetic sensor. For example, the relative position detection unit 400 may be a photoelectric sensor.

(4) Control Unit

The control unit 300 is connected to the respective configurations of the combination weigher 2 and configures part of the combination weigher 2 as a control unit of the combination weigher 2. Furthermore, the control unit 300 is electrically connected to the respective configurations of the film supply unit 200A and the respective configurations of the bagmaking and packaging unit 100 of the bagmaking and packaging machine 1000A (see FIG. 14). What is different from the first embodiment is that the control unit 300 is connected to the receiving member moving device 246 and the relative position detection unit 400 of the bagmaking and packaging machine 1000A.

In the second embodiment, in contrast to the first embodiment, the printing device control unit 236 of the laser printing device 230 serving as an example of an emission control unit stops the emission of the laser light by the laser printing device 230 in a case where it is determined, based on the detection result of the relative position detection unit 400, that the region where the laser printing device 230 emits the laser light and the reflection suppressing surface 242 of the receiving member 240 are not opposing each other. Below, this control will be described. It will be noted that except for the control described below, the control of the combination weigher 2 and the bagmaking and packaging machine 1000A by the control unit 300 is the same as the control of the combination weigher 2 and the bagmaking and packaging machine 1000 by the control unit 300 of the first embodiment.

<Control of Operation of Bagmaking and Packaging Machine Based on Detection Result of Relative Position Detection Unit>

If the bagmaking and packaging machine 1000A is operated in a state in which the reflection suppressing surface 242 is not disposed in a position opposing the printing position of the laser printing device 230 and the laser emitter 232 of the laser printing device 230 emits the laser light, the laser light that has passed through the film F has the potential to be reflected and have an effect on a person's eyes.

Thus, the control unit 300 controls the operation of the bagmaking and packaging machine 1000A as in the flowchart of FIG. 15. As a premise of the description, it will be assumed that the operation of the bagmaking and packaging machine 1000A is stopped.

First, the control unit 300 determines whether a command to start operating has been input via the touch panel display 4 or the like (step S11). In a case where it is determined that a command to start operating has been input, the process proceeds to step S12; otherwise, the process returns to step S11.

In step S12, the control unit 300 or the printing device control unit 236 determines, based on the detection result of the relative position detection unit 400, whether or not the laser emission region and the reflection suppressing surface 242 of the receiving member 240 are disposed in opposing positions.

In a case where it is determined that the laser emission region and the reflection suppressing surface 242 of the receiving member 240 are in an opposing state (this state will be called "the opposing state" below), the control unit 300 starts the operation of the bagmaking and packaging machine 1000A (step S13). At this time, the control unit 300 sends an operation command to the printing device control unit 236 of the laser printing device 230.

In a case where, in step S12, it is determined that the laser emission region and the reflection suppressing surface 242 of the receiving member 240 are not in an opposing state (this state will be called "the non-opposing state" below), the control unit 300 prohibits (stops) the operation of the bagmaking and packaging machine 1000A, and the process returns to step S11. At this time, the control unit 300 does not send an operation command to the printing device control unit 236 of the laser printing device 230. In other words, at this time, the control unit 300 prohibits (stops) the emission of the laser light by the laser printing device 230.

Also, after the bagmaking and packaging machine 1000A starts operating, the control unit 300 determines whether or not the laser emission region and the reflection suppressing surface 242 of the receiving member 240 are disposed in opposing positions based on the detection result of the relative position detection unit 400 (step S14). This process is repeated until the relative position detection unit 400 detects the non-opposing state or until a command to stop operating is input via the touch panel display 4 or the like (not shown in FIG.

In a case where, in step S14, it is determined that the laser emission region and the reflection suppressing surface 242 of the receiving member 240 are in the non-opposing state, the control unit 300 stops the operation of the bagmaking and packaging machine 1000A (step S15). At this time, the control unit 300 sends a command to stop operation to the printing device control unit 236 of the laser printing device 230 (stops the emission of the laser light by the laser printing device 230).

(5) Characteristics of Bagmaking and Packaging Machine

Characteristics of the bagmaking and packaging machine 1000A of the second embodiment other than those characteristics described in the first embodiment will be described.

(5-1)

The bagmaking and packaging machine 1000A includes the film conveyance device 20, the moving device 238, the receiving member moving device 246, and the control unit 300. The film conveyance device 20 conveys the film F in the conveyance direction A. The moving device 238 moves the laser printing device 230 in the left and right direction (a first direction) orthogonal to the conveyance direction A to change, in the left and right direction, the printing position of the laser printing device 230 relative to the printed surface Fa of the film F. The receiving member moving device 246 moves the receiving member 240 in the left and right direction. The control unit 300 controls the operations of the moving device 238 and the receiving member moving device 246 to cause the region where the laser printing device 230 emits the laser light and the reflection suppressing surface 242 of the receiving member 240 to oppose each other.

In the bagmaking and packaging machine 1000A, as the control unit 300 automatically causes the region where the laser printing device 230 emits the laser light and the reflection suppressing surface 242 of the receiving member 240 to oppose each other, even in a case where the receiving member 240 is movable, the occurrence of a situation where the laser light that has passed through the film F is reflected and has an effect on a person's eyes can be suppressed.

It will be noted that because the bagmaking and packaging machine 1000A has the receiving member moving device 246 that moves the receiving member 240, during work such as maintenance, the receiving member can be moved to a position where it is less likely to obstruct the work, and thus workability is easily improved. Furthermore, because the bagmaking and packaging machine 1000A has the receiving member moving device 246 that moves the receiving member 240, the size of the receiving member 240 need only be a size corresponding to the region where the laser printing device 230 emits the laser light (the size of the receiving member 240 can be reduced), and the receiving member 240 is less likely to obstruct work such as maintenance.

(5-2)

The bagmaking and packaging machine 1000A includes the printing device control unit 236, which serves as an example of an emission control unit, and the relative position detection unit 400. The printing device control unit 236 controls the emission of the laser light by the laser printing device 230. The relative position detection unit 240 detects the relative positions of the laser printing device 230 and the reflection suppressing surface 242 of the receiving member 240. The printing device control unit 236 stops the emission of the laser light in a case where it is determined, based on the detection result of the relative position detection unit 400, that the region where the laser printing device 230 emits the laser light and the reflection suppressing surface 242 of the receiving member 240 are not opposing each other.

In the bagmaking and packaging machine 1000A, the laser light is not emitted in a case where the region where the laser printing device 230 emits the laser light and the reflection suppressing surface 242 of the receiving member 240 are not opposing each other, so the occurrence of a situation where the laser light that has passed through the film F is reflected and has an effect on a person's eyes can be suppressed, and the level of safety is high.

(5-3)

In the bagmaking and packaging machine 1000A, the relative position detection unit 400 has the magnet and the magnetic sensor. The magnet is attached to one of (A) the laser printing device 230 or the first member 410 that is moved together with the laser printing device 230 by the moving device 238 or (B) the receiving member 240 or the second member 420 that is moved together with the receiving member 240 by the receiving member moving device 246. The magnetic sensor is attached to the other of (A) the laser printing device 230 or the first member 410 that is moved together with the laser printing device 230 by the moving device 238 or (B) the receiving member 240 or the second member 420 that is moved together with the receiving member 240 by the receiving member moving device 246.

In the bagmaking and packaging machine 1000A, the relative positions of the laser printing device 230 and the reflection suppressing surface 242 of the receiving member 240 can be accurately detected.

(6) Example Modifications

The packaging apparatus (the bagmaking and packaging machine 1000A) of the second embodiment of the present invention has been described above, but the present invention is not limited to the above embodiment, and various changes may be made thereto without departing from the spirit of the invention.

For example, in the above embodiment, the moving device 238 and the receiving member moving device 246 are separate devices, but the laser printing device 230 and the receiving member 240 may be moved by a single device.

REFERENCE SIGNS LIST

14 Former
20 Film Conveyance Device
40 Transverse Sealing Mechanism

210 Film Roll Retention Unit (Retention Device)
230 Laser Printing Device
236 Printing Device Control Unit (Emission Control Unit)
238 Moving Unit (Moving Device)
240 Receiving Member
241b Resin Portion
242 Reflection Suppressing Surface
246 Receiving Member Moving Device
260 Cover
264 Maintenance Door (Door)
266 Open/Close Detector (Detector)
300 Control Unit
400 Relative Position Detector
402 Magnet/Magnetic Sensor
404 Magnetic Sensor/Magnet
410 First Member
420 Second Member
1000 Bagmaking and Packaging Machine (Packaging Apparatus)
1000A Bagmaking and Packaging Machine (Packaging Apparatus)
C Articles
F Film
Fa Printed surface
Fb Non-printed surface (First Surface)

The invention claimed is:

1. A packaging apparatus configured to package articles with a film, the packaging apparatus comprising:
   a laser printing device configured to print on a printed surface of the film;
   a receiving member disposed so as to oppose a first surface on an opposite side of the printed surface of the film at a position located across from the laser printing device;
   a cover that is disposed around the laser printing device and is configured to obstruct passage of the laser light emitted by the laser printing device, the cover including a door for maintenance of the laser printing device;
   a detector configured to detect whether the door is open or closed; and
   an emission control unit configured to control the emission of the laser light by the laser printing device,
   wherein the receiving member has a reflection suppressing surface configured to suppress regular reflection of laser light emitted by the laser printing device, and
   the emission control unit is configured to stop the emission of the laser light by the laser printing device in a case where the detector is detecting that the door is open.

2. The packaging apparatus according to claim 1, wherein the receiving member includes a resin portion having the reflection suppressing surface.

3. The packaging apparatus according to claim 1, wherein the receiving member has a regular reflection suppression processed surface as the reflection suppressing surface.

4. The packaging apparatus according to claim 1, further comprising
   a film conveyance device configured to convey the film in a conveyance direction,
   a film retention device that is disposed upstream of the laser printing device in the conveyance direction, and
   a control unit configured to control the operation of the film conveyance device.

5. The packaging apparatus according to claim 1, wherein the reflection suppressing surface of the receiving member is configured to at least partially contact the first surface of the film conveyed in the conveyance direction.

6. The packaging apparatus according to claim 1, further comprising a former and a transverse sealing mechanism that are disposed downstream of the laser printing device in the conveyance direction,
   wherein the former is configured to form the conveyed film in a cylindrical shape, and
   the transverse sealing mechanism is configured to seal the film formed in the cylindrical shape in a direction intersecting the conveyance direction in a state in which the articles have been input to the film formed in the cylindrical shape.

7. The packaging apparatus according to claim 1, further comprising
   a film conveyance device configured to convey the film in a conveyance direction,
   a moving device configured to move the laser printing device in a first direction orthogonal to the conveyance direction to change, in the first direction, a printing position of the laser printing device relative to the printed surface of the film,
   a receiving member moving device configured to move the receiving member in the first direction, and
   a control unit configured to control the operations of the moving device and the receiving member moving device to cause a region where the laser printing device emits the laser light and the reflection suppressing surface of the receiving member to oppose each other.

8. The packaging apparatus according to claim 7, further comprising
   an emission control unit configured to control the emission of the laser light by the laser printing device, and
   a relative position detection unit configured to detect the relative positions of the laser printing device and the reflection suppressing surface,
   wherein the emission control unit is configured to stop the emission of the laser light in a case where it is determined, based on the detection result of the relative position detection unit, that the region where the laser printing device emits the laser light and the reflection suppressing surface of the receiving member are not opposing each other.

9. The packaging apparatus according to claim 8, wherein the relative position detection unit has a magnet and a magnetic sensor,
   the magnet is attached to one of (A) the laser printing device or a first member that is configured to be moved together with the laser printing device by the moving device or (B) the receiving member or a second member that is configured to be moved together with the receiving member by the receiving member moving device, and
   the magnetic sensor is attached to the other of (A) the laser printing device or the first member that is configured to be moved together with the laser printing device by the moving device or (B) the receiving member or the second member that is configured to be moved together with the receiving member by the receiving member moving device.

10. The packaging apparatus according to claim 1, further comprising a moving device configured to move the laser printing device in a first direction orthogonal to the conveyance direction to change, in the first direction, a printing position of the laser printing device relative to the printed surface of the film, the reflection suppressing surface of the receiving member extends in the first direction to oppose the first surface of the film across the entire width of the film in the first direction.

* * * * *